United States Patent
Wang et al.

(10) Patent No.: US 11,095,513 B2
(45) Date of Patent: *Aug. 17, 2021

(54) SCALABLE CONTROLLER FOR HARDWARE VTEPS

(71) Applicant: Nicira, Inc., Palo Alto, CA (US)

(72) Inventors: Ziyou Wang, Beijing (CN); Hua Wang, Beijing (CN); Ariel Tubaltsev, Los Gatos, CA (US); Hsin-Yi Shen, San Jose, CA (US); Sarvani Vakkalanka, Cupertino, CA (US); Anupam Chanda, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 16/403,493

(22) Filed: May 3, 2019

(65) Prior Publication Data
US 2019/0260637 A1 Aug. 22, 2019

Related U.S. Application Data

(63) Continuation of application No. 15/004,946, filed on Jan. 24, 2016, now Pat. No. 10,313,186.
(Continued)

(51) Int. Cl.
*H04L 12/24* (2006.01)
*H04L 12/721* (2013.01)
(Continued)

(52) U.S. Cl.
CPC .......... *H04L 41/082* (2013.01); *G06F 16/258* (2019.01); *H04L 41/044* (2013.01);
(Continued)

(58) Field of Classification Search
None
See application file for complete search history.

(56) References Cited

U.S. PATENT DOCUMENTS

| 5,526,484 A | 6/1996 | Casper et al. |
| 5,751,967 A | 5/1998 | Raab et al. |

(Continued)

FOREIGN PATENT DOCUMENTS

| EP | 1154601 A1 | 11/2001 |
| EP | 1653688 A1 | 5/2006 |

(Continued)

OTHER PUBLICATIONS

Non-Published Commonly Owned U.S. Appl. No. 16/987,548, filed Aug. 7, 2020, 78 pages, Nicira, Inc.
(Continued)

*Primary Examiner* — Kodzovi Acolatse
(74) *Attorney, Agent, or Firm* — Adeli LLP

(57) ABSTRACT

For a virtual distributed network environment employing physical forwarding elements that includes both software forwarding elements and third party devices serving as hardware forwarding elements, a scalable method for synchronizing configuration data of logical forwarding elements that are distributed across the various physical forwarding elements is provided. The method generates and updates the configuration data at a set of central controllers and then distributes the configuration data to the physical forwarding elements. The method delivers the updated configuration data to some of the physical forwarding elements by (i) determining a delta/differential between the updated configuration data held at the central controller and the obsolete configuration data held at those physical forwarding elements and (ii) delivering the determined differential configuration data to the physical forwarding elements.

20 Claims, 14 Drawing Sheets

Related U.S. Application Data

(60) Provisional application No. 62/212,515, filed on Aug. 31, 2015.

(51) Int. Cl.
*G06F 16/25* (2019.01)
*H04L 12/715* (2013.01)
*H04L 29/06* (2006.01)
*H04L 29/08* (2006.01)

(52) U.S. Cl.
CPC .......... *H04L 41/0893* (2013.01); *H04L 45/44* (2013.01); *H04L 45/64* (2013.01); *H04L 63/20* (2013.01); *H04L 67/1012* (2013.01)

(56) References Cited

U.S. PATENT DOCUMENTS

| | | |
|---|---|---|
| 6,243,394 B1 | 6/2001 | Deng |
| 6,640,251 B1 | 10/2003 | Wiget et al. |
| 6,850,529 B1 | 2/2005 | Wong |
| 7,463,639 B1 | 12/2008 | Rekhter |
| 7,933,198 B1 | 4/2011 | Pan |
| 7,937,438 B1 | 5/2011 | Miller et al. |
| 8,046,456 B1 | 10/2011 | Miller et al. |
| 8,161,095 B2 | 4/2012 | Manion et al. |
| 8,345,688 B2 | 1/2013 | Zhou et al. |
| 8,386,642 B2 | 2/2013 | Elzur |
| 8,589,919 B2 | 11/2013 | Smith et al. |
| 8,874,876 B2 | 10/2014 | Bhadra et al. |
| 8,897,134 B2 | 11/2014 | Kern et al. |
| 8,943,490 B1 | 1/2015 | Jain et al. |
| 8,964,528 B2 | 2/2015 | Casado et al. |
| 9,014,181 B2 | 4/2015 | Lakshman et al. |
| 9,032,095 B1 | 5/2015 | Traina et al. |
| 9,100,285 B1 | 8/2015 | Choudhury et al. |
| 9,130,870 B1 | 9/2015 | Swierk et al. |
| 9,154,433 B2 | 10/2015 | Koponen et al. |
| 9,178,833 B2 | 11/2015 | Koponen et al. |
| 9,306,843 B2 | 4/2016 | Koponen et al. |
| 9,319,375 B2 | 4/2016 | Gross et al. |
| 9,331,940 B2 | 5/2016 | Balus et al. |
| 9,369,426 B2 | 6/2016 | Koponen et al. |
| 9,397,946 B1 | 7/2016 | Yadav |
| 9,455,901 B2 | 9/2016 | Davie et al. |
| 9,485,149 B1 | 11/2016 | Traina et al. |
| 9,577,927 B2 | 2/2017 | Hira et al. |
| 9,621,461 B2 | 4/2017 | Sun |
| 9,633,040 B2 | 4/2017 | Lee |
| 9,667,541 B2 | 5/2017 | Song |
| 9,699,070 B2 | 7/2017 | Davie et al. |
| 9,755,965 B1 | 9/2017 | Yadav et al. |
| 9,819,581 B2 | 11/2017 | Chanda et al. |
| 9,847,938 B2 | 12/2017 | Chanda et al. |
| 9,917,799 B2 | 3/2018 | Chanda |
| 9,923,815 B2 | 3/2018 | Assarpour et al. |
| 9,942,058 B2 | 4/2018 | Chanda et al. |
| 9,948,577 B2 | 4/2018 | Chanda |
| 9,967,182 B2 | 5/2018 | Chanda et al. |
| 9,979,593 B2 | 5/2018 | Chanda et al. |
| 9,992,112 B2 | 6/2018 | Chanda |
| 9,998,324 B2 | 6/2018 | Chanda et al. |
| 9,998,375 B2 | 6/2018 | Chanda |
| 10,153,965 B2 | 12/2018 | Davie et al. |
| 10,182,035 B2 | 1/2019 | Basler |
| 10,200,343 B2 | 2/2019 | Chanda et al. |
| 10,230,576 B2 | 3/2019 | Chanda et al. |
| 10,250,553 B2 | 4/2019 | Chanda et al. |
| 10,263,828 B2 | 4/2019 | Chanda et al. |
| 10,313,186 B2 | 6/2019 | Wang et al. |
| 10,411,912 B2 | 9/2019 | Chanda et al. |
| 10,447,618 B2 | 10/2019 | Chanda |
| 10,554,484 B2 | 2/2020 | Chanda et al. |
| 10,659,431 B2 | 5/2020 | Basler |
| 10,764,111 B2 | 9/2020 | Chanda et al. |
| 10,805,152 B2 | 10/2020 | Chanda et al. |
| 2002/0001310 A1 | 1/2002 | Mai et al. |
| 2002/0065919 A1 | 5/2002 | Taylor et al. |
| 2002/0093952 A1 | 7/2002 | Gonda |
| 2003/0041170 A1 | 2/2003 | Suzuki |
| 2003/0163645 A1 | 8/2003 | Tremblay et al. |
| 2004/0037279 A1 | 2/2004 | Zelig et al. |
| 2004/0052216 A1 | 3/2004 | Roh |
| 2004/0267866 A1 | 12/2004 | Carollo et al. |
| 2005/0163115 A1 | 7/2005 | Dontu et al. |
| 2005/0262132 A1 | 11/2005 | Morita et al. |
| 2006/0092940 A1 | 5/2006 | Ansari et al. |
| 2007/0028039 A1 | 2/2007 | Gupta et al. |
| 2007/0115961 A1 | 5/2007 | Dorenbosch et al. |
| 2008/0189769 A1 | 8/2008 | Casado et al. |
| 2008/0215586 A1 | 9/2008 | Pruet |
| 2009/0006603 A1 | 1/2009 | Duponchel et al. |
| 2009/0150527 A1 | 6/2009 | Tripathi et al. |
| 2009/0161547 A1 | 6/2009 | Riddle et al. |
| 2011/0026521 A1 | 2/2011 | Gamage et al. |
| 2011/0075674 A1* | 3/2011 | Li .......................... H04L 45/54 370/401 |
| 2011/0090911 A1 | 4/2011 | Hao et al. |
| 2011/0158086 A1 | 6/2011 | Sakauchi et al. |
| 2011/0206047 A1 | 8/2011 | Donthamsetty et al. |
| 2011/0286326 A1 | 11/2011 | Awano |
| 2011/0299537 A1 | 12/2011 | Saraiya et al. |
| 2011/0317559 A1 | 12/2011 | Kern et al. |
| 2012/0011106 A1 | 1/2012 | Reid et al. |
| 2012/0084406 A1 | 4/2012 | Kumbalimutt |
| 2012/0147898 A1 | 6/2012 | Koponen et al. |
| 2012/0215876 A1 | 8/2012 | Ohtake |
| 2012/0236761 A1 | 9/2012 | Yang et al. |
| 2012/0278802 A1 | 11/2012 | Nilakantan et al. |
| 2012/0290694 A9 | 11/2012 | Marl et al. |
| 2012/0303835 A1 | 11/2012 | Kempf et al. |
| 2013/0044636 A1 | 2/2013 | Koponen et al. |
| 2013/0044641 A1 | 2/2013 | Koponen et al. |
| 2013/0051399 A1 | 2/2013 | Zhang et al. |
| 2013/0054773 A1 | 2/2013 | Onoue |
| 2013/0058208 A1 | 3/2013 | Pfaff et al. |
| 2013/0058225 A1 | 3/2013 | Casado et al. |
| 2013/0058229 A1 | 3/2013 | Casado et al. |
| 2013/0058350 A1 | 3/2013 | Fulton |
| 2013/0058351 A1 | 3/2013 | Casado et al. |
| 2013/0060929 A1 | 3/2013 | Koponen et al. |
| 2013/0103817 A1 | 4/2013 | Koponen et al. |
| 2013/0103818 A1 | 4/2013 | Koponen et al. |
| 2013/0114466 A1 | 5/2013 | Koponen et al. |
| 2013/0121209 A1 | 5/2013 | Padmanabhan et al. |
| 2013/0132533 A1 | 5/2013 | Padmanabhan et al. |
| 2013/0223454 A1 | 8/2013 | Dunbar et al. |
| 2013/0287026 A1 | 10/2013 | Davie |
| 2013/0315246 A1 | 11/2013 | Zhang et al. |
| 2013/0322453 A1 | 12/2013 | Allan |
| 2013/0329548 A1 | 12/2013 | Nakil et al. |
| 2013/0336134 A1 | 12/2013 | Bao et al. |
| 2014/0029451 A1 | 1/2014 | Nguyen |
| 2014/0029618 A1 | 1/2014 | Janardhanan |
| 2014/0071986 A1* | 3/2014 | Isobe ..................... H04L 1/187 370/389 |
| 2014/0101467 A1 | 4/2014 | Jubran et al. |
| 2014/0195666 A1 | 7/2014 | Dumitriu et al. |
| 2014/0201738 A1 | 7/2014 | Choi et al. |
| 2014/0229605 A1 | 8/2014 | Besser |
| 2014/0269683 A1 | 9/2014 | Bhagavathiperumal et al. |
| 2014/0269709 A1 | 9/2014 | Benny et al. |
| 2014/0301391 A1 | 10/2014 | Krishnan et al. |
| 2014/0348161 A1 | 11/2014 | Koponen et al. |
| 2014/0362775 A1 | 12/2014 | Steiner et al. |
| 2015/0009992 A1 | 1/2015 | Zhang |
| 2015/0100560 A1 | 4/2015 | Davie et al. |
| 2015/0100675 A1* | 4/2015 | Davie .................. H04L 12/4641 709/223 |
| 2015/0100704 A1* | 4/2015 | Davie .................... H04L 45/14 709/238 |
| 2015/0103838 A1 | 4/2015 | Zhang et al. |
| 2015/0124586 A1 | 5/2015 | Pani |
| 2015/0124809 A1 | 5/2015 | Edsall et al. |

(56) References Cited

U.S. PATENT DOCUMENTS

| | | |
|---|---|---|
| 2015/0124821 A1 | 5/2015 | Chu et al. |
| 2015/0195178 A1 | 7/2015 | Bhattacharya et al. |
| 2015/0215189 A1 | 7/2015 | Lim |
| 2015/0281075 A1 | 10/2015 | Park et al. |
| 2015/0326425 A1* | 11/2015 | Natarajan ............ H04L 41/0654 370/216 |
| 2015/0326524 A1 | 11/2015 | Tankala et al. |
| 2015/0334696 A1 | 11/2015 | Gu et al. |
| 2015/0372906 A1* | 12/2015 | Tirat ....................... H04L 45/42 370/392 |
| 2015/0379150 A1 | 12/2015 | Duda |
| 2016/0014039 A1 | 1/2016 | Reddy et al. |
| 2016/0014073 A1 | 1/2016 | Reddy et al. |
| 2016/0173535 A1* | 6/2016 | Barabash ............ H04L 41/0893 726/1 |
| 2016/0197824 A1 | 7/2016 | Lin et al. |
| 2016/0212222 A1 | 7/2016 | Bultema et al. |
| 2016/0232019 A1* | 8/2016 | Shah .................. G06F 9/45558 |
| 2016/0308690 A1 | 10/2016 | Chanda et al. |
| 2016/0352633 A1 | 12/2016 | Kapadia et al. |
| 2016/0380812 A1 | 12/2016 | Chanda et al. |
| 2017/0034002 A1* | 2/2017 | Sinn ........................ H04L 41/12 |
| 2017/0034051 A1 | 2/2017 | Chanda et al. |
| 2017/0034052 A1 | 2/2017 | Chanda et al. |
| 2017/0034053 A1 | 2/2017 | Chanda et al. |
| 2017/0063608 A1 | 3/2017 | Wang et al. |
| 2017/0085502 A1 | 3/2017 | Biruduraju |
| 2017/0093617 A1 | 3/2017 | Chanda et al. |
| 2017/0093618 A1 | 3/2017 | Chanda et al. |
| 2017/0093636 A1 | 3/2017 | Chanda et al. |
| 2017/0093646 A1 | 3/2017 | Chanda et al. |
| 2017/0093686 A1 | 3/2017 | Uttaro et al. |
| 2017/0093758 A1 | 3/2017 | Chanda |
| 2017/0126615 A1 | 5/2017 | Chanda et al. |
| 2017/0171055 A1 | 6/2017 | Wang et al. |
| 2017/0171077 A1 | 6/2017 | Chanda |
| 2017/0171078 A1 | 6/2017 | Chanda |
| 2017/0171113 A1 | 6/2017 | Chanda |
| 2017/0208097 A1* | 7/2017 | Kirby ................... G06F 21/604 |
| 2017/0272316 A1 | 9/2017 | Johnson et al. |
| 2017/0317928 A1 | 11/2017 | Gude et al. |
| 2017/0366446 A1 | 12/2017 | Davie et al. |
| 2018/0007004 A1 | 1/2018 | Basler |
| 2018/0007005 A1 | 1/2018 | Chanda et al. |
| 2018/0026895 A1 | 1/2018 | Wang et al. |
| 2018/0183730 A1 | 6/2018 | Chanda |
| 2018/0219699 A1 | 8/2018 | Chanda et al. |
| 2018/0241622 A1 | 8/2018 | Chanda et al. |
| 2018/0241672 A1 | 8/2018 | Chanda et al. |
| 2018/0248796 A1 | 8/2018 | Chanda et al. |
| 2019/0089622 A1 | 3/2019 | Davie et al. |
| 2019/0141011 A1 | 5/2019 | Basler |
| 2019/0207904 A1 | 7/2019 | Chanda et al. |
| 2019/0238393 A1 | 8/2019 | Chanda et al. |
| 2019/0356512 A1 | 11/2019 | Chanda et al. |
| 2020/0021541 A1 | 1/2020 | Chanda |
| 2020/0366553 A1 | 11/2020 | Chanda et al. |

FOREIGN PATENT DOCUMENTS

| | | |
|---|---|---|
| JP | 2003069609 A | 3/2003 |
| WO | 2005112390 A1 | 11/2005 |
| WO | 2008095010 A1 | 8/2008 |

OTHER PUBLICATIONS

Al-Fares, Mohammad, et al., "A Scalable, Commodity Data Center Network Architecture," SIGCOMM '08, Aug. 17-22, 2008, 12 pages, Seattle, Washington, USA.

Graubner, Pablo, et al., "Cloud Computing: Energy-Efficient Virtual Machine Consolidation," IT Professional, Mar. 2013, 7 pages, vol. 15, Issue 2, IEEE.

Non-Published commonly owned U.S. Appl. No. 16/240,654, filed Jan. 4, 2019, 65 pages, Nicira, Inc.

Non-Published Commonly Owned U.S. Appl. No. 16/294,891, filed Mar. 6, 2019, 39 pages, Nicira, Inc.

Non-Published Commonly Owned U.S. Appl. No. 16/294,891, filed Apr. 12, 2019, 66 pages, Nicira, Inc.

Pfaff, Ben, et al., "The Open vSwitch Database Management Protocol," draft-pfaff-ovsdb- proto-00, Aug. 20, 2012, 34 pages, Nicira, Inc., Palo Alto, California, USA.

* cited by examiner

SCALABLE CONTROLLER FOR HARDWARE VTEPS

CLAIM OF BENEFIT TO PRIOR APPLICATIONS

The present Application is a continuation application of U.S. patent application Ser. No. 15/004,946, filed Jan. 24, 2016, now published as U.S. Patent Publication 2017/0063608. U.S. patent application Ser. No. 15/004,946, claims the benefit of U.S. Provisional Patent Application 62/212,515, filed Aug. 31, 2015. U.S. Provisional Patent Applications 62/212,515 and U.S. patent application Ser. No. 15/004,946, now published as U.S. Patent Publication 2017/0063608 are incorporated herein by reference.

BACKGROUND

There is a growing movement, driven by both industry and academia, towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. A virtual network that is implemented for a tenant of a hosting system is a good example of a SDN networking. The virtual (logical) network of a tenant of the hosting system connects a set of virtual machines that are assigned to the tenant, to each other and to other virtual and/or physical networks.

One of the challenges in today's hosting system networks is extending the virtual networks (e.g., of one or more tenants) to other physical networks through physical switches (e.g., third party switches). One solution involves employing a specific type of switch to connect to the other physical networks, and having this switch serve as an L2 gateway. However, such a switch can become a bottleneck, and will have less throughput than dedicated hardware. Having the central network controller communicate directly with the third party switches requires the central controller to understand the different protocols required, and leaves the central controller subject to malicious network attacks such as Denial of Service (DoS) and Distributed DoS (DDoS) attacks from the third party switching devices.

SUMMARY

For a virtual distributed network environment employing physical forwarding elements that includes both software forwarding elements and third party devices serving as hardware forwarding elements, some embodiments provide a scalable method for synchronizing configuration data of logical forwarding elements that are distributed across the various physical forwarding elements. Some embodiments generate and update the configuration data at a set of central controllers and then distribute the configuration data to the physical forwarding elements. Some embodiments deliver the updated configuration data to some of the physical forwarding elements by (i) determining a delta/differential between the updated configuration data held at the central controller and the obsolete configuration data held at those physical forwarding elements and (ii) delivering the determined differential configuration data to the physical forwarding elements.

In some embodiments, the virtual distributed network environment provides a set of third party device managers as intermediary between the central controllers and the third party hardware forwarding elements. Each of the third party device managers interfaces its own set of third party device by using communication/message protocols that are specific to or optimized for the set of third party devices, allowing the central controllers to communicate with all physical forwarding elements (both software and third party hardware) in a uniform protocol. In some of these embodiments, each third party device manager delivers the differential configuration data to the third party hardware forwarding elements using the communication protocols specific to those third party devices.

Some embodiments provide a method for delivering the configuration data of logical forwarding element to the MHFEs through the MHFE controller such that the MHFE controller minimizes memory usage by avoiding caching unnecessary configuration data. Specifically, some embodiments deliver the configuration data to the MHFEs by (i) determining a delta/differential between the up-to-date configuration data held at the central controller and the obsolete configuration data held at those physical forwarding elements and (ii) delivering the determined differential configuration data to the physical forwarding elements.

In some embodiments, the MHFE controller computes the differential configuration data and provides the computed differential configuration data to MHFEs according to the protocols of the MHFE (e.g., OVSDB commands). The MHFE controller removes or purges any configuration data of the logical forwarding element from its memory as soon as it is not needed for determining the differential configuration data. In some embodiments, when a controller updates the configuration of a logical forwarding element, it sends the changes due to the update as differential configuration to the MHFE controller and the MHFE controller in turn provide the differential configuration to the MHFEs according to the protocols of the MHFE (e.g., OVSDB commands).

In some embodiments, when a TOR is first connected to the CCP, the corresponding TOR agent of the TOR would initiate an initial synchronization of the logical forwarding elements between the TOR and the CCP. Such synchronization in some embodiments relies on the TOR agent to compare the up-to-date state (or configuration data) of a given logical forwarding element held at the CCP with the unknown and possibly obsolete state of the given logical forwarding element held at the TOR. The TOR agent then produces a set of OVSDB commands based on the delta (i.e., differential configuration data) to update the state of the logical forwarding element at the TOR.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

For a virtual distributed network environment employing physical forwarding elements that includes both software forwarding elements and third party devices serving as hardware forwarding elements, some embodiments provide a scalable method for synchronizing configuration data of logical forwarding elements that are distributed across the various physical forwarding elements. Some embodiments generate and update the configuration data at a set of central controllers and then distribute the configuration data to the physical forwarding elements. Some embodiments deliver the updated configuration data to some of the physical forwarding elements by (i) determining a delta/differential between the updated configuration data held at the central controller and the obsolete configuration data held at those physical forwarding elements and (ii) delivering the determined differential configuration data to the physical forwarding elements.

In some embodiments, the virtual distributed network environment provides a set of third party device managers as intermediary between the central controllers and the third party hardware forwarding elements. Each of the third party device managers interfaces its own set of third party device by using communication/message protocols that are specific to or optimized for the set of third party devices, allowing the central controllers to communicate with all physical forwarding elements (both software and third party hardware) in a uniform protocol. In some of these embodiments, each third party device manager delivers the differential configuration data to the third party hardware forwarding elements using the communication protocols specific to those third party devices.

Figure 1:
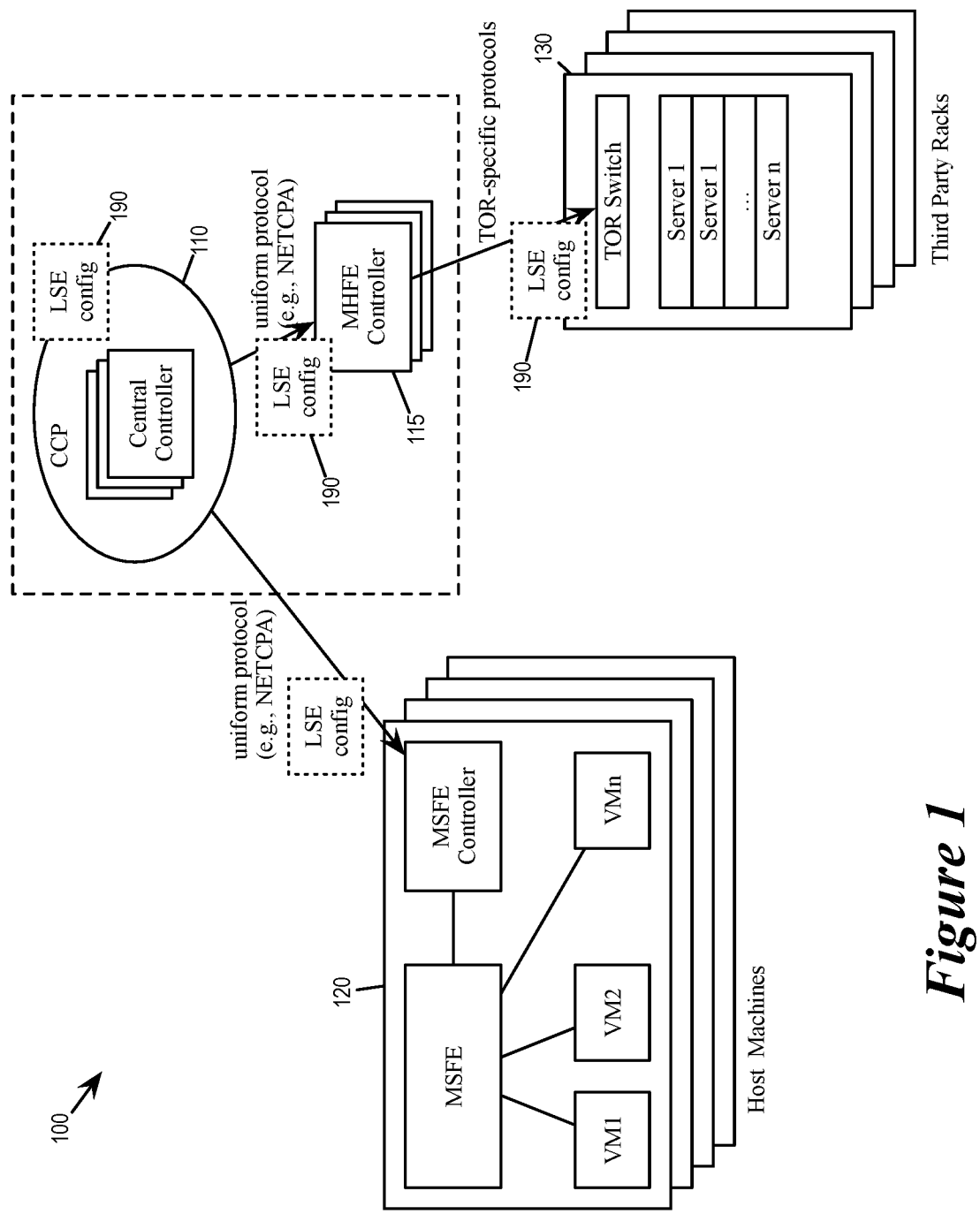
FIG. 1 illustrates a virtual distributed network environment that distributes configuration data of logical forwarding elements from central controllers to physical forwarding elements.

FIG. 1 illustrates a virtual distributed network environment 100 that distributes configuration data of logical forwarding elements from central controllers to physical forwarding elements. As illustrated, the virtual distributed network environment 100 includes a set of central controllers 110, a set of third party device managers 115, a set of software forwarding elements 120, and a set of third party devices 130 serving has hardware forwarding elements. The configuration data 190 for logical forwarding elements are generated by the central controllers 110 and delivered to the physical forwarding elements 120 and 130. The delivery of the configuration data 190 to the third party hardware forwarding elements 130 is through the set of third party device managers 115.

The virtual distributed network environment 100 provides various virtualized computing and networking resources for one or more tenants. In some embodiments, the virtual distributed network environment 100 is provided by a datacenter at one physical site, or is jointly provided by multiple physical sites or multiple data center. The virtualized distributed network environment 100 is built upon a physical network that interconnects various physical endpoints. Some of these network physical endpoints are computing devices such as switches, routers, edge appliances, computers, etc. These computing devices serve as the computing and networking resources of the virtualized distributed network environment 100.

Some of the networking resources provided by the virtualized distributed network environment 100 are physical forwarding elements, which are responsible for physically forwarding packets among the various physical endpoints of the network, as well as to and from the world outside of the virtualized distributed network environment 100. Some of these physical forwarding elements are software forwarding elements (120), and some of these physical forwarding elements are hardware forwarding elements (130). The central controllers 110 of the virtualized distributed network environment 100 controls both types of physical forwarding elements by generating and providing configuration data (e.g., 190).

The software forwarding elements 120 are provided by computing devices that operate virtualization software. The virtualization software allows such a computing device to host a set of virtual machines (VMs) as well as to perform packet-forwarding operations (including L2 switching and L3 routing operations). These computing devices are therefore also referred to as host machines. The packet forwarding operations of the software forwarding elements are managed and controlled by the central controllers 110, and therefore a software forwarding element is also referred to as a managed software forwarding element (MSFE) in some embodiments. In some embodiments, the MSFE perform its packet forwarding operations for one or more logical forwarding elements as the virtualization software of the host machine operates local instantiations of the logical forwarding elements as physical forwarding elements. Some of these physical forwarding elements are managed physical routing elements (MPREs) for performing L3 routing operations for a logical routing element (LRE), some of these physical forwarding elements are managed physical switching elements (MPSEs) for performing L2 switching operations for a logical switching element (LSE). Software forwarding elements or (host machines) will be further described in Section III below.

The hardware forwarding elements 130 are devices that do not operate virtualization software and whose packet forwarding capabilities are determined by its own hardware (and the software/firmware running thereof). A hardware forwarding element is often a switch that is at the top of a rack provided by a third party. They are therefore also referred to as top-of-rack (TOR) switches. Each TOR has its own specific communication protocols or configuration procedures that may be different from other physical forwarding elements. These TOR switches are of limited configurability when compared to the software forwarding elements, however, they can still be configured to perform packet forwarding operations for some of the logical forwarding elements of the virtualized distributed network environment 100. Each hardware forwarding element 130 is therefore also referred to as a managed hardware forwarding element (MHFE).

The central controllers 110 are also referred to as a central controller plane (CCP). The virtualized distributed network environment 100 in some embodiments provide a cluster of computing devices that serve as a control cluster that provides the CCP. The central controllers 110 control the operations of various physical forwarding elements. Specifically, in some embodiments, the central controllers 110 control these physical forwarding elements in order to implement the logical forwarding elements of the virtual distributed network environment 100. In order to do so, the central controllers 110 generates, maintains, and updates configuration data 190 related to the logical forwarding elements. The central controllers delivers the configuration data 190 to the physical forwarding elements 120 and 130 in order to control the operations of the various logical forwarding elements.

The set of third party device managers 115 serve as intermediary between the central controllers 110 and the third party hardware forwarding elements 130. As the hardware forwarding elements are referred to as TORs or MHFEs, these third party device managers are also referred to as TOR agents or MHFE controllers. In some embodiments, the software running on the MSFEs and the central controllers are from a same vendor such that they can communicate with each other using a uniform protocol. Such a uniform protocol can be a proprietary protocol (such as NETCPA of VMWare™) that is highly optimized to the operations of the datacenter. However, as mentioned, a MHFE may use a different communication protocol (e.g., OVSDB) that is different from the uniform protocol of the central controllers. The MHFE controllers 115 insulate the CCP 110 from such MHFE-specific (or TOR-specific) communication protocols by using the uniform protocol to communicate with the CCP 110 and by using the MHFE-specific protocols to communicate with the MHFEs 130.

In some embodiments, a TOR agent/MHFE controller is controller in the controller cluster that is dedicated to handling communication with TORs. In some embodiments, a TOR agent is a process or application running in one of the central controllers in the CCP. In some embodiments, a TOR agent is a virtual machine running in one of the host machines. In some embodiments, a TOR agent operated by a stand-alone device that is connected to the physical network but outside of the controller cluster.

Figure 2:
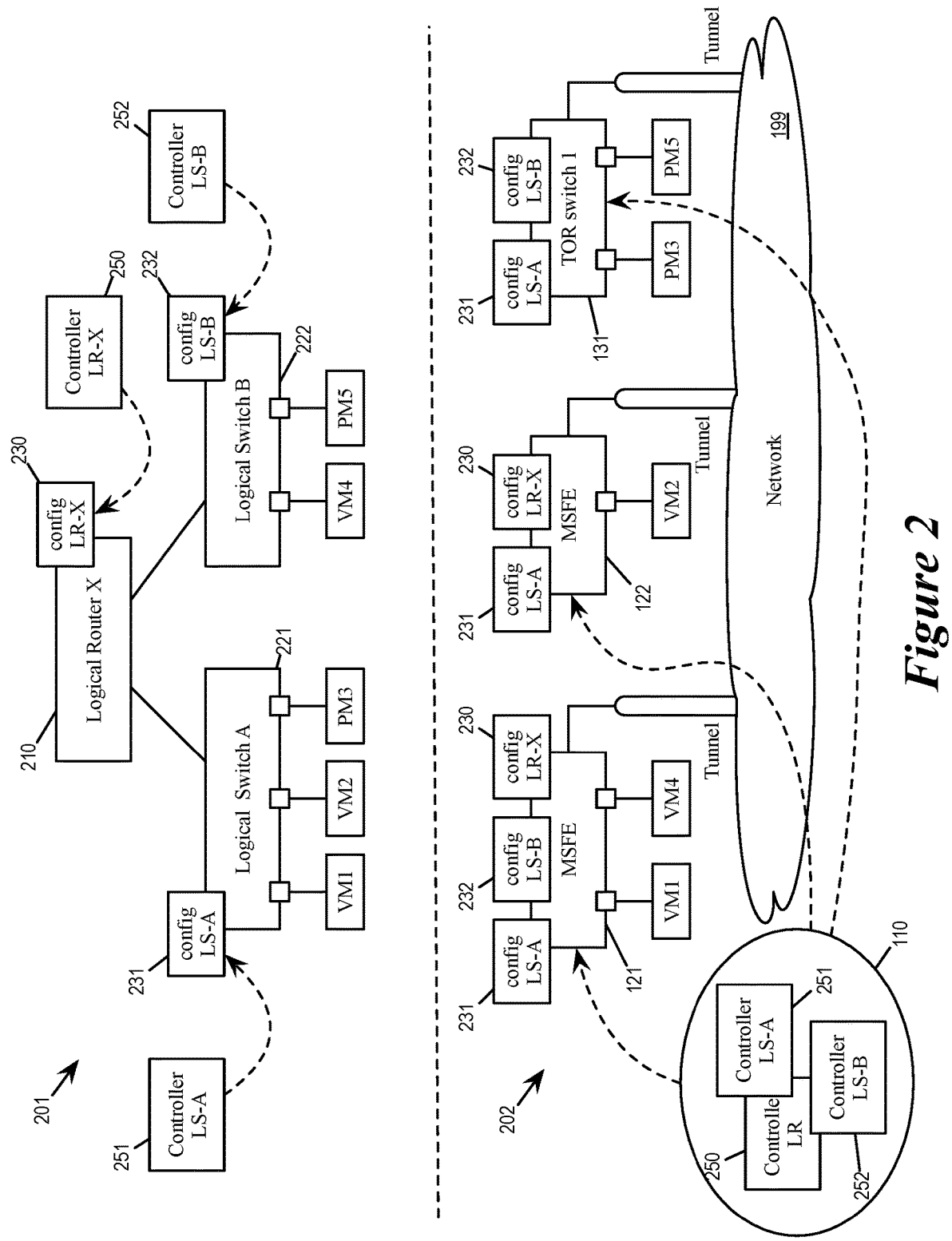
FIG. 2 illustrates the implementation of logical forwarding elements in a virtual distributed network environment.

FIG. 2 illustrates the implementation of logical forwarding elements in the virtual distributed network environment 100. The virtual distributed network environment 100 provides computing and network resources to support end machines VM1, VM2, PM3, VM4, and PM5. An end machine can be a virtual machine (e.g., VM1, VM2, and VM4) that is hosted by a virtualization software on a host machine, or a physical switch (PM3 and PM5) that is provided by a third party rack (i.e., a TOR). The figure illustrates the virtual distributed network environment 100 in a logical view 201 and in a physical view 202.

The logical view 201 illustrates the logical relationship between several logical forwarding elements of the virtual distributed network environment 100. As illustrated, the network is implementing a logical router X 220, a logical switch A 221, and a logical switch B 222. The logical switch A 221 connects end machines VM1, VM2, and PM3 and provides L2 forwarding to and from these three end machines. The logical switch B 222 connects end machines VM4 and PM5 and provides L2 forwarding to and from these two end machines. Each logical switch can also be viewed as a L2 segment, or a VNI (virtual network identifier). The logical router X 220 provides L3 routing between these two VNIs.

Each logical forwarding element operates according to a set of configuration data. Some of these configuration data are organized into tables such as routing tables, forwarding tables, match-action tables, flow tables, VM MAC tables, VTEP (virtual tunnel endpoint) tables, and ARP tables. As illustrated, the logical router X 220 operates according to configuration data 230, the logical switch A 221 operates according to configuration data 231, and the logical switch B 222 operates according to configuration data 232. These different sets of configuration data are provided by the central controllers 110. In some embodiments, the control of the logical forwarding elements is sharded among the controllers in the CCP 110 such that an individual controller is assigned to be the master controller of one or more logical forwarding elements. As illustrated, a controller 250 controls the logical router 220, a controller 251 controls the logical switch 221, and the a controller 252 controls the configuration of the logical switch 222. A controller controls a logical forwarding element by providing the configuration data of the logical forwarding element to the physical forwarding elements that implement the logical forwarding element. (In some embodiments, the controllers 251-250 may be the same controller).

The physical view 201 illustrates the implementation of the various logical forwarding elements by the physical forwarding elements 120 and 130. As illustrated, a physical network 199 interconnects MSFE 121, MSFE 122 and MHFE 131. In some embodiments, each of the physical forwarding elements sends and receives packet from the physical network through tunnels provided by encapsulation networks (e.g., VXLAN), and each physical forwarding element behave as a tunnel endpoints, e.g., VTEPs in VXLAN. In some embodiments, each hardware physical forwarding element (i.e., TOR switch) is also referred to as a "hardware VTEP".

The MSFE 121 is in a host machine that hosts VM1 and VM4, and the MSFE 121 correspondingly implements local copies of the logical router X 220, the logical switch A 221, and the logical switch B 222. The MSFE 122 is in a host machine that hosts VM2, and the MSFE 121 correspondingly implements local copies of the logical router X 220 and the logical switch A 221. The MHFE 131 is in a TOR switch that provide access for PM3 and PM5, and the MHFE 121 correspondingly needs information/configuration data for the logical switch A 221 and the logical switch B 222 in order to bridge to these two logical switches (e.g., from VLANs of external network).

The central controllers 110 controls the operations of the logical forwarding elements in the physical forwarding elements 121, 122 and 131. Specifically, the controller 251 for logical switch A 221 provides configuration data for logical switch A to MSFE 121, MSFE 122, and MHFE 131. The controller 252 for logical switch B 222 provides configuration data for logical switch A to MSFE 121 and MHFE 131. The controller 250 for logical router X 220 provides configuration data for the logical router to MSFEs 121 and 122.

A given TOR such as the MHFE 131 may be bridging one or more logical switches. In some embodiments, a TOR Agent such as the MHFE controller 115 obtains the VM MAC table (and other tables) of a logical switch from the CCP node that is the logical master of that logical switch (VNI). The TOR agent then pushes down this information to the TOR (e.g., 131) through an OVSDB channel.

Several more detailed embodiments of the invention are described below. Section I discusses the differential configuration of TOR switches. Section II describes an example TOR switch that is configurable by some embodiments of the invention. Section III describes an example host machine that is used to provide computing and network resources for the virtualized distributed network environment for some embodiments of the invention. Finally, section V describes an electronic system with which some embodiments of the invention are implemented.

I. Differential Configuration of TOR Switches

In some embodiments, one TOR agent (as a process at a controller or as a independent device) manages a group of TORs, whether these TORs all share the same communication protocol or use a variety of different communication protocols. However, as a virtual distributed network environment grow in size, the number TORs needed can also grow, and the number of TORs that a given TOR agent has to handle would also grow. Since a given TOR could be bridging any number of VNIs, it is possible that a TOR agent would have to obtain the configuration data associated with many different VNIs from the CCP. If the TOR Agent caches the configuration data for all of these different VNIs when delivering configuration data from the CCP to the TORs, the memory usage of the TOR agent would quickly become a bottleneck, making it difficult to scale design to incorporate additional TORs.

Figure 3:
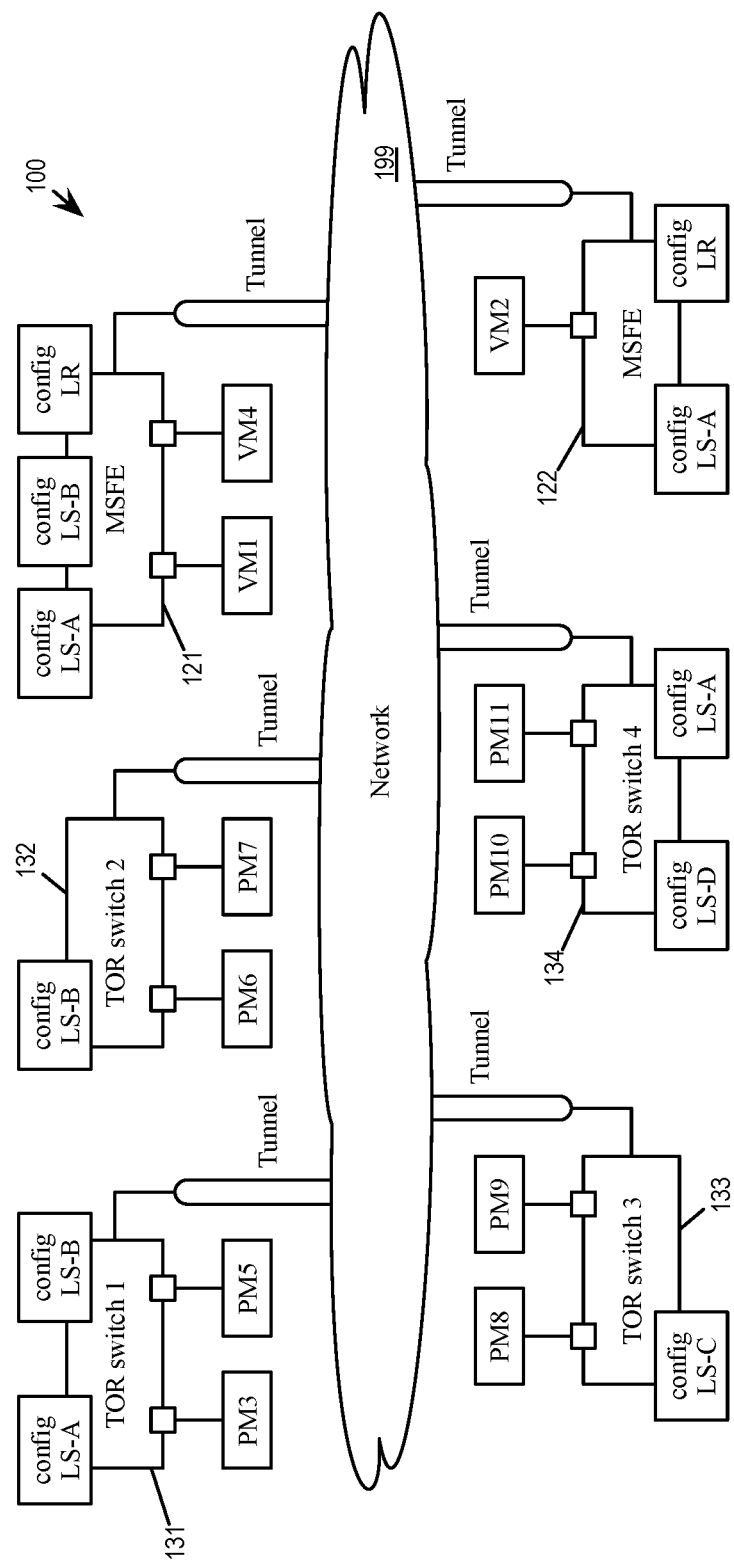
FIG. 3 illustrates a scaled up virtual distributed network environment.

FIG. 3 illustrates a scaled up virtual distributed network environment 300. The network environment 300 is scaled up from the virtual distributed network work environment 100 to include additional MHFEs (TOR switches) 132-134. The MHFE 131 is bridging to logical switches A, and B, the MHFE 132 is bridging to logical switch B, the MHFE 133 is bridging to logical switch C, and the MHFE 134 is bridging to logical switch A and D. These MHFEs 131-134 all rely on the MHFE controller 115 for receiving configuration data from the CCP 110.

Figure 4:
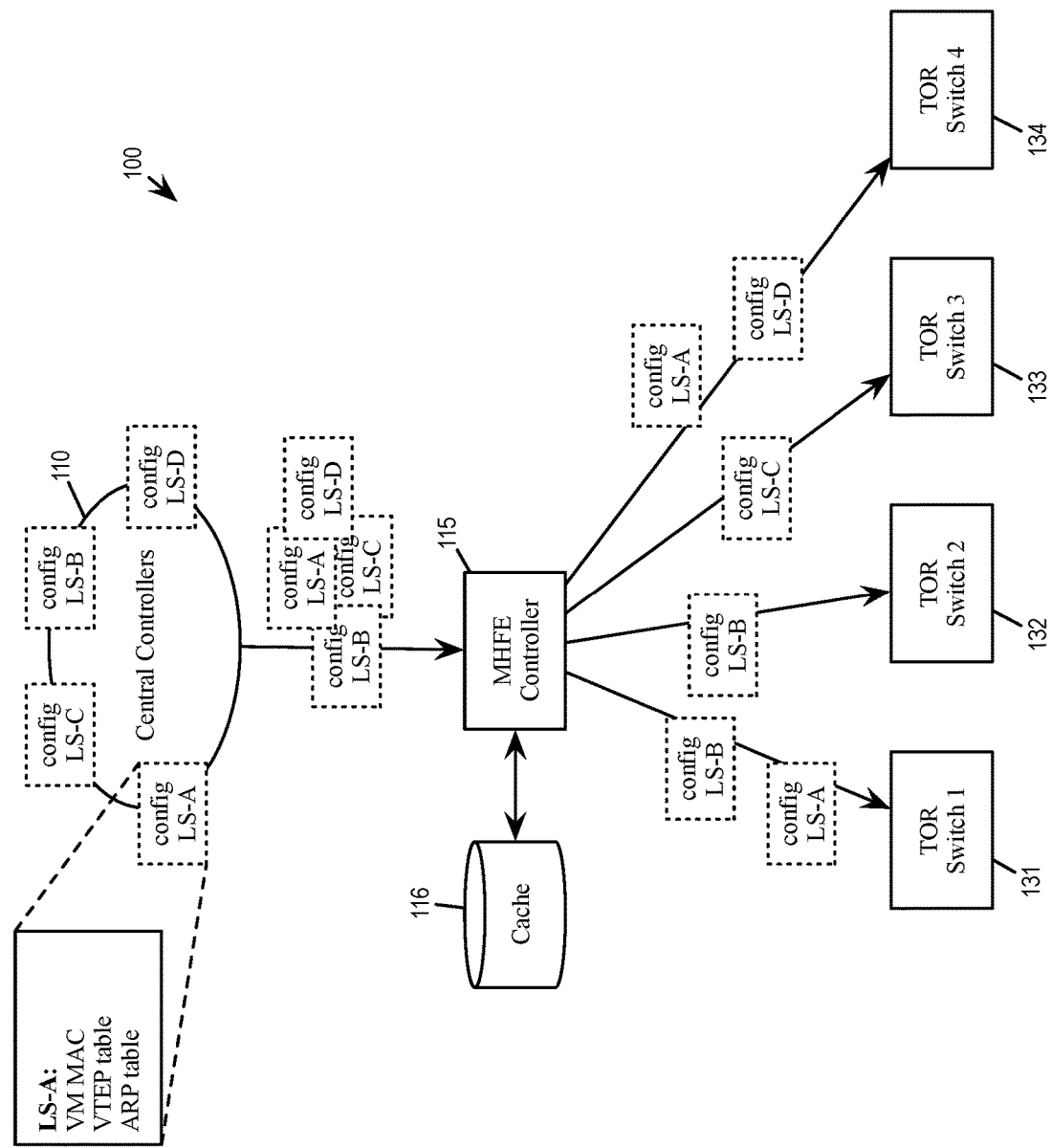
FIG. 4 illustrates the delivery of configuration data of the logical switches to TORs thorough a TOR agent.
Figure 5A:
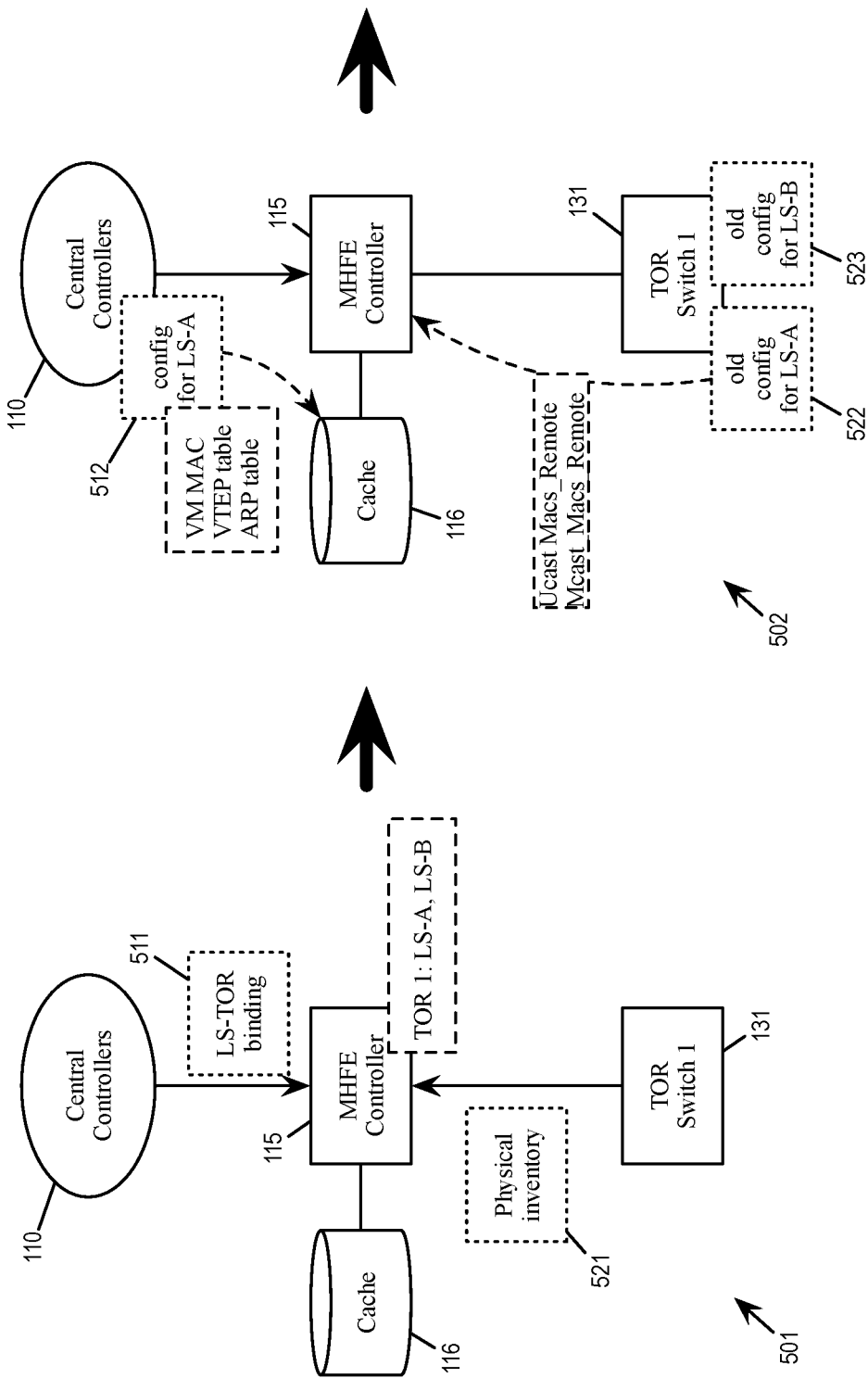
FIGS. 5a-d illustrate the synchronization of the state of a logical forwarding element between central controller and a TOR through a TOR agent.
Figure 5B:
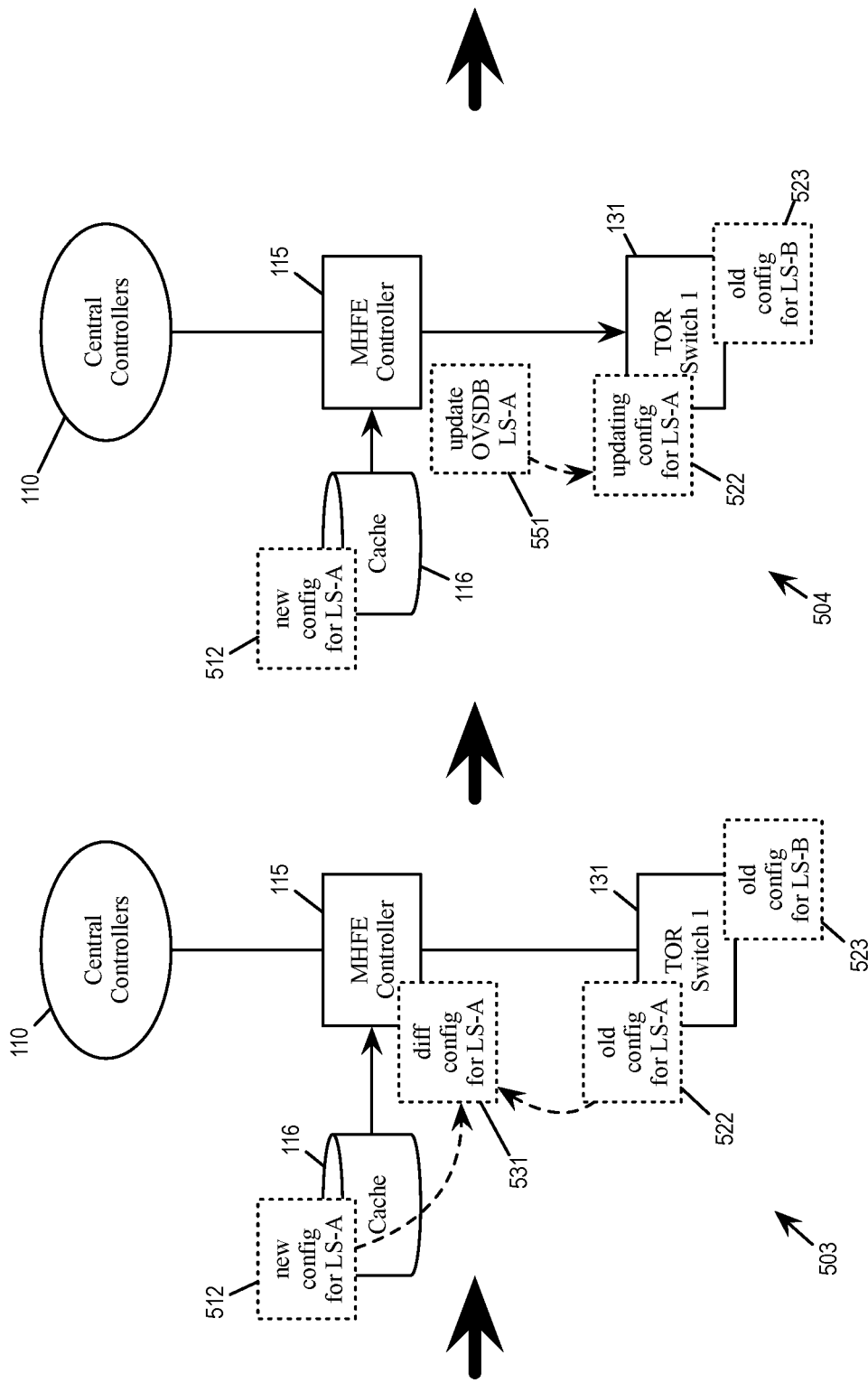
Figure 5C:
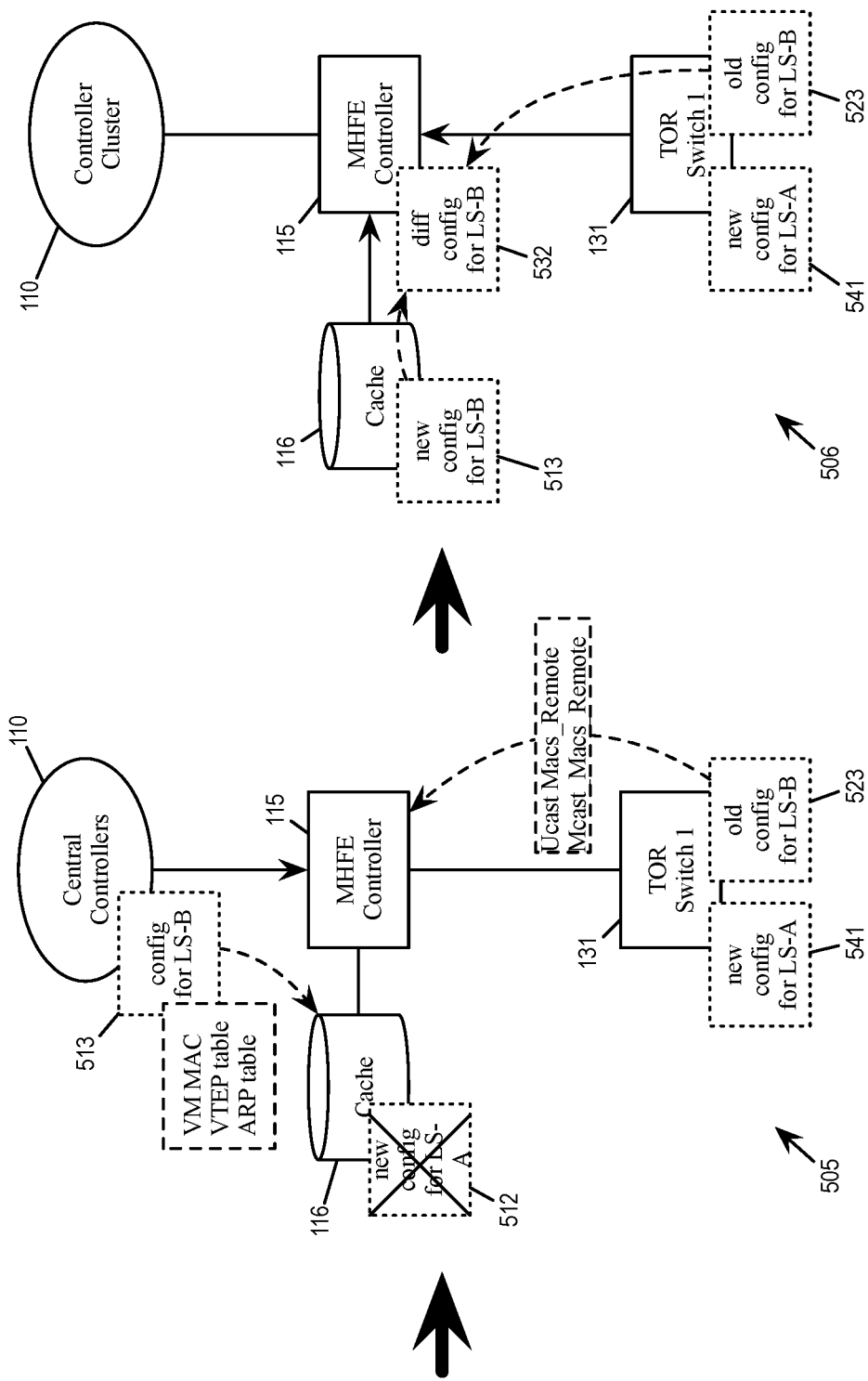
Figure 5D:
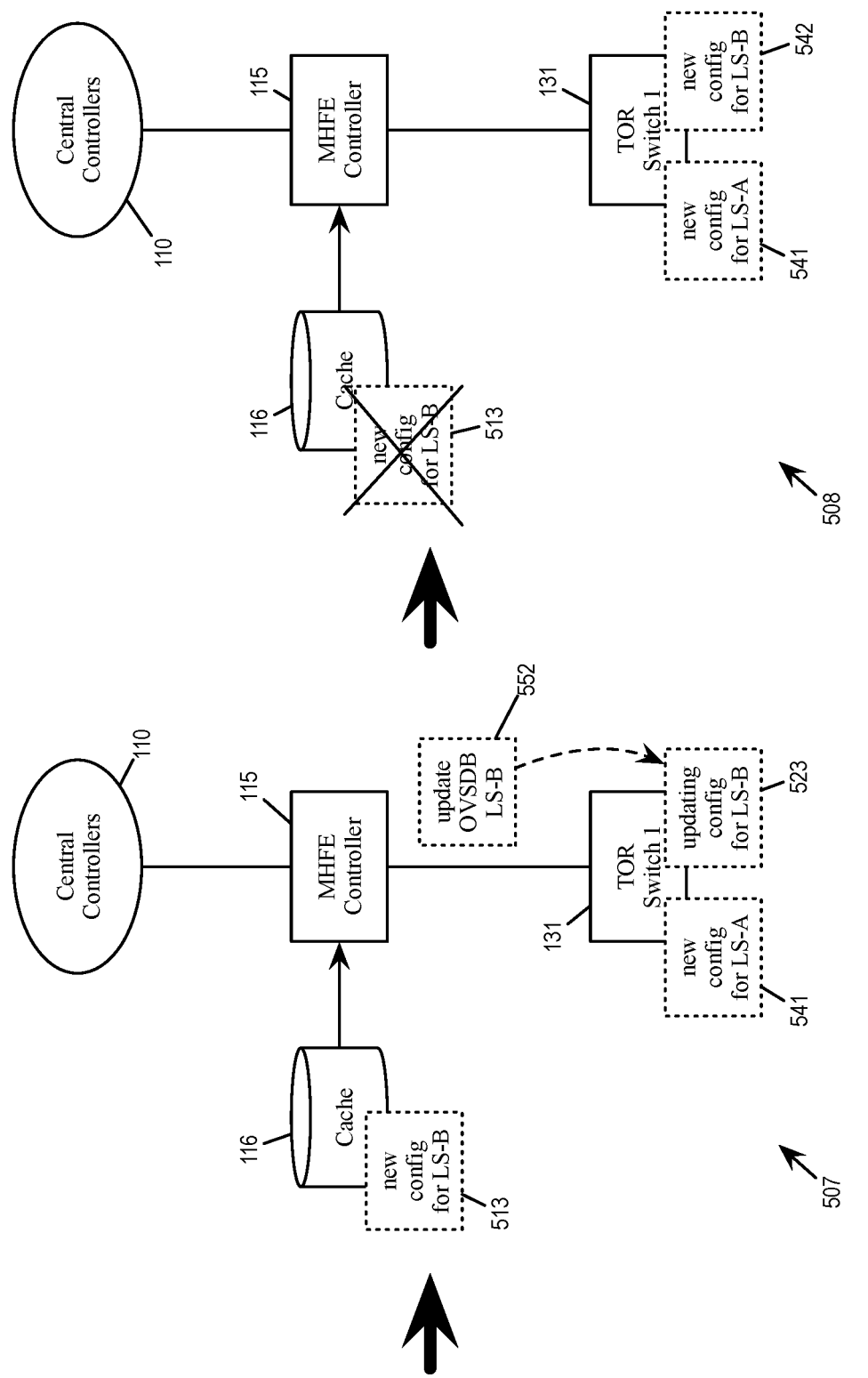

FIG. 4 illustrates the delivery of configuration data of the logical switches to the MHFEs 131-134 thorough the MHFE controller 115. Since the MHFEs 131-134 all rely on the MHFE controller 115 for deliver of configuration data, the configuration data for the logical switches/VNIs connected to by these MHFEs would all have to be delivered by the MHFE controller 115. In other words, the MHFE 115 would have to store configuration data for all of logical switches A, B, C, D, even though those states are already available at central controllers.

Some embodiments provide a method for delivering the configuration data of logical forwarding element to the MHFEs through the MHFE controller such that the MHFE controller minimizes memory usage by avoiding caching unnecessary configuration data. Specifically, some embodiments deliver the configuration data to the MHFEs by (i) determining a delta/differential between the up-to-date configuration data held at the central controller and the obsolete configuration data held at those physical forwarding elements and (ii) delivering the determined differential configuration data to the physical forwarding elements.

In some embodiments, the MHFE controller computes the differential configuration data and provides the computed differential configuration data to MHFEs according to the protocols of the MHFE (e.g., OVSDB commands). The MHFE controller removes or purges any configuration data of the logical forwarding element from its memory as soon as it is not needed for determining the differential configuration data. In some embodiments, when a controller updates the configuration of a logical forwarding element, it sends the changes due to the update as differential configuration to the MHFE controller and the MHFE controller in turn provide the differential configuration to the MHFEs according to the protocols of the MHFE (e.g., OVSDB commands).

In some embodiments, when a TOR is first connected to the CCP, the corresponding TOR agent of the TOR would initiate an initial synchronization of the logical forwarding elements between the TOR and the CCP. Such synchronization in some embodiments relies on the TOR agent to compare the up-to-date state (or configuration data) of a given logical forwarding element held at the CCP with the unknown and possibly obsolete state of the given logical forwarding element held at the TOR. The TOR agent then produces a set of OVSDB commands based on the delta (i.e., differential configuration data) to update the state of the logical forwarding element at the TOR.

FIGS. 5a-d illustrate the synchronization of the state of a logical forwarding element between the CCP 110 and the TOR (MHFE) 131 through the TOR agent 115 (MHFE controller). The figures illustrates the synchronization of the state of the logical switch A (121) between the CPP 110 and the TOR 131 in eight stages 501-508.

The first stage 501 shows some of the actions undertaken by the TOR agent 115 following the establishment of the connection between the TOR 131 and the CPP 110 through the TOR agent 115. As illustrated, the TOR agent 115 receives TOR-LS binding 511 from the CPP and the physical inventory 521 from the TOR 131. The physical inventory 521 identifies the resources in the TOR that are available for implementing logical forwarding elements in the virtual distributed network environment 100. In some embodiments, the TOR agent 115 monitors the TOR 115 for information such as the physical switch table and physical port table. Based on the received TOR-LS binding 511 and the received physical inventory, the TOR agent 115 is able to determine which logical switches (VNIs) should exist on the TOR 131, namely logical switches A and B.

Once the TOR agent has determined which logical switch should exist on the TOR 131, it initiates a full initial synchronization operation with the CCP for the TOR 131. The initial synchronization ensures that the states (i.e., configuration data) of the logical switches A and B in the TOR 131 would match that in the CCP 110. FIGS. 5a-d illustrate this initial synchronization operation from the second stage 502 to the eighth stage 508.

The second stage 502 shows the start of the full initial synchronization operation. As illustrated, the TOR 131 has obsolete states or configuration data for both logical switch A and B (522 and 523). The CCP 110 pushes configuration data 512 for the logical switch A to the TOR agent 115. This configuration data in some embodiments includes several tables such as the VM MAC table, VTEP table, and ARP table. The configuration data 512 is cached in the storage 116. The TOR agent 115 also queries the TOR 131 for its current state by e.g., querying for its remote MAC tables (Ucast_Macs_Remote and Mcast_Macs_Remote) of the TOR 131.

The third stage 503 shows the TOR agent 115 computing a differential configuration data between the up-to-date configuration data and the obsolete configuration data for the logical switch A. For some embodiments in which the configuration data includes tables such as forwarding tables and/or routing tables, the differential configuration data includes instructions to add or remove entries from those tables. Since CCP 110 has pushed the up-to-date configuration data 512 of logical switch A to the TOR agent 115 and the configuration data is cached there, the TOR agent can use this cached version of the up-to-date configuration data to compute the differential configuration. Furthermore, since the TOR agent 115 has queried for the initial state of the TOR 131, it also has the initial configuration or the state of the logical switch A. The TOR agent is therefore able to computes the differential configuration 531 (for logical switch A) based on the up-to-date state of logical switch A (at the storage 116) and the initial state of the TOR 131.

At the fourth stage 504, the TOR agent 115 converts the computed differential configuration into a series of command or messages 551 that are understood by the TOR 131 (e.g. commands using OVSDB protocol). In some embodiments, these commands address specific physical resources in the TOR 131. In some embodiments, these commands modify, insert, and/or delete entries of tables in the TOR 131. These series of commands updates the configuration data for logical switch A according to the differential configuration 531 so that the TOR 131 would have the same configuration data or the state for the logical switch A as the CCP 110. The updating process ends when the TOR agent 115 has completed all of the commands 551 with the TOR 131.

At the fifth stage 505, the TOR agent 115 has completed updating the configuration data/state of logical switch A in the TOR 131 (so the TOR 131 now has the up-to-date configuration data 541 for logical switch A). The TOR agent 115 then removes the configuration data 512 for logical switch A from its cache storage 116. In some embodiments, the TOR agent removes a configuration data from its cache as soon as it is no longer needed, e.g., when it has completed computing the differential configuration data. As mentioned above by reference to stage 501, the TOR agent 115 knows that the TOR is also implementing/bridging logical switches B. As part of the full initial sync operation, the CCP 110 pushes configuration data 513 for the logical switch A to the TOR agent 115. This configuration data in some embodiments includes several tables such as the VM MAC table, VTEP table, and ARP table. The configuration data 513 is cached in the storage 116. The TOR agent 115 also queries the TOR 131 for its current state by e.g., querying for its remote MAC tables (Ucast_Macs_Remote and Mcast_Macs_Remote) of the TOR 131.

At the sixth stage 506, the TOR agent 115 computes a differential configuration data between the up-to-date configuration data and the obsolete configuration data for the logical switch B. Since CCP 110 has pushed the up-to-date configuration data 513 of logical switch B to the TOR agent 115 and the configuration data is cached there, the TOR agent can use this cached version of the up-to-date configuration data to compute the differential configuration. Furthermore, since the TOR agent 115 has queried for the initial state of the TOR 131, it also has the initial configuration or the state of the logical switch B. The TOR agent is therefore able to computes the differential configuration 532 (for logical switch B) based on the up-to-date state of logical switch B (at the storage 116) and the initial state of the TOR 131.

At the seventh stage 507, the TOR agent 115 converts the computed differential configuration into a series of command or messages 552 that are understood by the TOR 131. These series of commands updates the configuration data for logical switch B according to the differential configuration 532 so that the TOR 131 would have the same configuration data or the state for the logical switch B as the CCP 110. The updating process ends when the TOR agent 115 has completed all of the commands 552 with the TOR 131.

At the eighth stage 508, the TOR agent 115 has completed updating the configuration data/state of logical switch B in the TOR 131. The TOR agent 115 then removes the configuration data 513 for logical switch B from its cache storage 116. The TOR 131 now has up-to-date configuration data/state for both logical switches A and B (configuration data 541 and 542). Since there is no other logical switch in the TOR 131 that needs updating, the TOR agent 115 concludes the full initial sync operation.

Once the full initial sync operation is completed, the TOR agent 115 and the CCP 110 know that the TOR 131 has the up-to-date configuration for its logical forwarding elements (i.e., logical switches A and B). From this point on, the CCP 110 would send only different configuration data to the TOR agent 115 whenever it update the state or configuration data of one of the logical forwarding elements. In other words, the synchronization of configuration data/state of logical forwarding elements between the CCP and the TOR has reached steady state.

Figure 6:
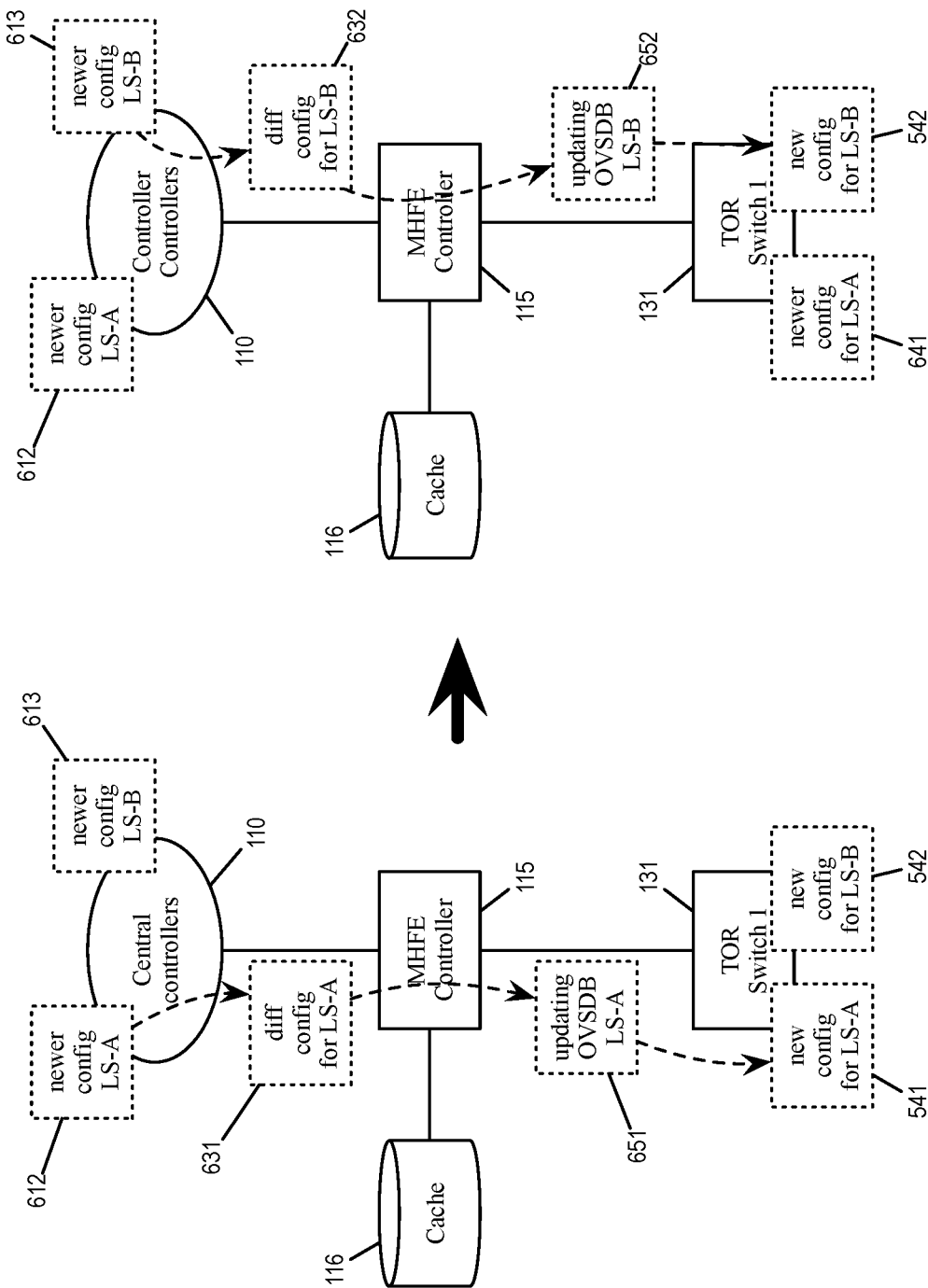
FIG. 6 illustrates steady state synchronization through TOR agent.

FIG. 6 illustrates steady state synchronization through TOR agent. Specifically, the figure illustrates the steady state synchronization of logical switches A and B through the TOR agent 115. As illustrated, the TOR 131 has up-to-date configuration (541 and 542) for logical switches A and B. However, the CCP 110 has updated its configuration data for logical switches A and B to a newer state (illustrated as "newer" configuration data 612 and 613, respectively. The figure illustrates the steady state synchronization in two stages 601 and 602.

At the first stage 601, the CCP 110 sends differential configuration data 631 for logical switch A to the TOR agent 131. The CCP compute this differential configuration data 631 based on the changes to logical switch A that has been made since the previous synchronization. This differential configuration data 631 is directly applicable to the TOR 131 since the TOR 131 has gone through full-synchronization with the CPP and its state is known to the CPP 110. Based on this differential configuration data 631, the TOR agent 131 generates a set of OVSDB commands 651 to the TOR 131. The TOR agent 131 sends the set of OVSDB commands 651 to the TOR 131, which updates the configuration data 541 for logical switch A in the TOR 131.

At the second stage 602, the state or configuration data for logical switch A in the TOR 131 has been updated to the "newer" configuration data 641. This newer configuration data 641 is now up-to-date with regard to what is being held at the CCP 110 (i.e., the newer configuration data 612 for logical switch A). The CCP 110 at stage 602 is also sending a differential configuration data 632 for the logical switch B that is based on the newer state of logical switch B being held at the CCP 110 (i.e., the configuration data 613). Based on this differential configuration data 632, the TOR agent 131 generates a set of OVSDB commands 652 to the TOR 131. The TOR agent 131 sends the set of OVSDB commands 652 to the TOR 131, which updates the configuration data 542 for logical switch B in the TOR 131.

Figure 7:
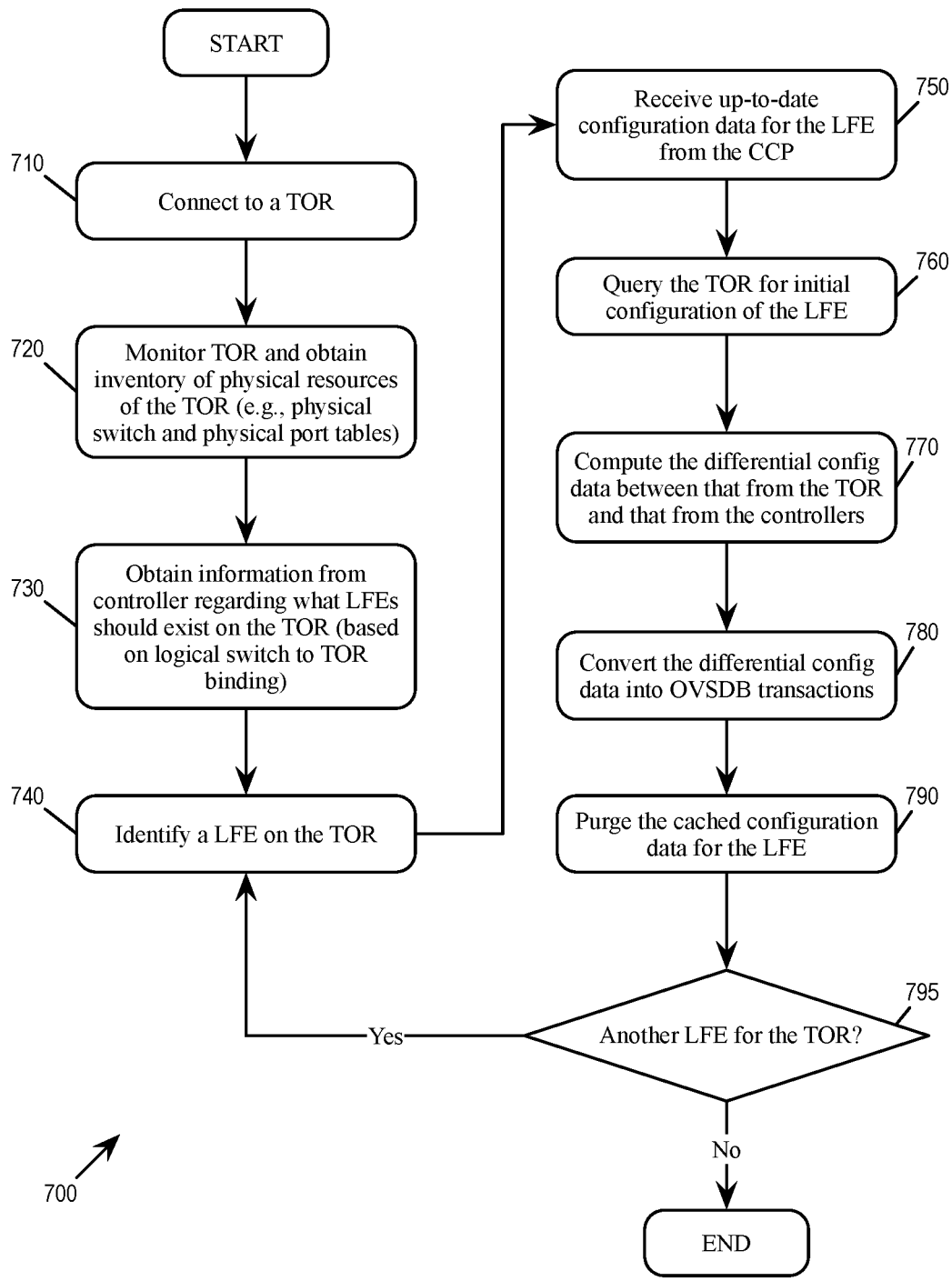
FIG. 7 conceptually illustrates a process for synchronizing the configuration data or the state of a logical forwarding element.

FIG. 7 conceptually illustrates a process 700 for synchronizing the configuration data or the state of a logical forwarding element. In some embodiments, a TOR agent such as the TOR agent 131 performs the process 700. Since a TOR agent is itself a process operating in a central controller in some embodiments, the process 700 is performed at a central controller in some of these embodiments. FIGS. 5a-d above describe examples of the process 700.

The process 700 starts when the CCP connects (710) to a TOR. This is an initial connection, where the state of the TOR is unknown to the CCP prior to this point, and the CCP does not know the state of any logical forwarding element in the TOR. Consequently, in some embodiments, the process 700 is part of a full initial synchronization between a CCP and a newly connected TOR.

The process then monitors (at 720) the TOR and obtains an inventory of physical resources of the TOR. In some embodiments, such monitoring including monitoring the physical switch and physical port tables of the TOR. The process then obtains (at 730) configuration data from the CCP regarding what logical forwarding elements should exist on the TOR. This is based on the logical switch to TOR binding received from the CCP in some embodiments. The operations 720 and 730 corresponds to stage 501 of FIG. 5a for some embodiments.

Based on what is known about which logical forwarding element exist in the TOR, the process identifies (at 740) a logical forwarding element that the TOR is using, implementing, interfacing, or bridging. The process then receives (at 750) an up-to-date set of configuration data or state for the logical forwarding element from the CCP. In some embodiments, this data is temporarily cached at a storage of the TOR agent. In some embodiments, the CCP pushes the VM MAC table, VTEP table, and ARP table to the TOR agent. The process also queries (at 760) the TOR for the initial state or configuration for the logical forwarding element. In some embodiments, this is done by querying the remote MAC tables in the TOR such as Ucast_Macs-_Remote, Mcast_Macs_Remote tables. The operations 750 and 760 corresponds to the stage 502 of FIG. 5a in some embodiments.

Next, the process computes (at 770) the differential configuration data for the logical forwarding element based on the up-to-date configuration of the LFE received from the CCP and the obsolete configuration of the LFE queried from the TOR. The operation 770 corresponds to the stage 503 of FIG. 5b. The process then converts (780) the computed differential configuration data into commands understood by the TOR (e.g., OVSDB commands) and perform the corresponding OVSDB transactions with the TOR. These transactions update the initial configuration of the LFE to match that held at the CCP. The operation 780 corresponds to the stage 504 of FIG. 5b.

Next, the process purges (at 790) the cached configuration data for the LFE from the storage of the TOR agent. In some embodiments, the process purges the LFE configuration data as soon as configuration data is not needed (e.g., as soon as the computation of the differential configuration data is complete). The operation 790 corresponds to the stage 505 of FIG. 5c.

The process then determines if there is another logical forwarding element at the TOR that needs to be updated or synchronized with the CCP. If the TOR has another LFE that needs to be synchronized/updated, the process returns to 740. Otherwise the process 700 ends.

Figure 8:
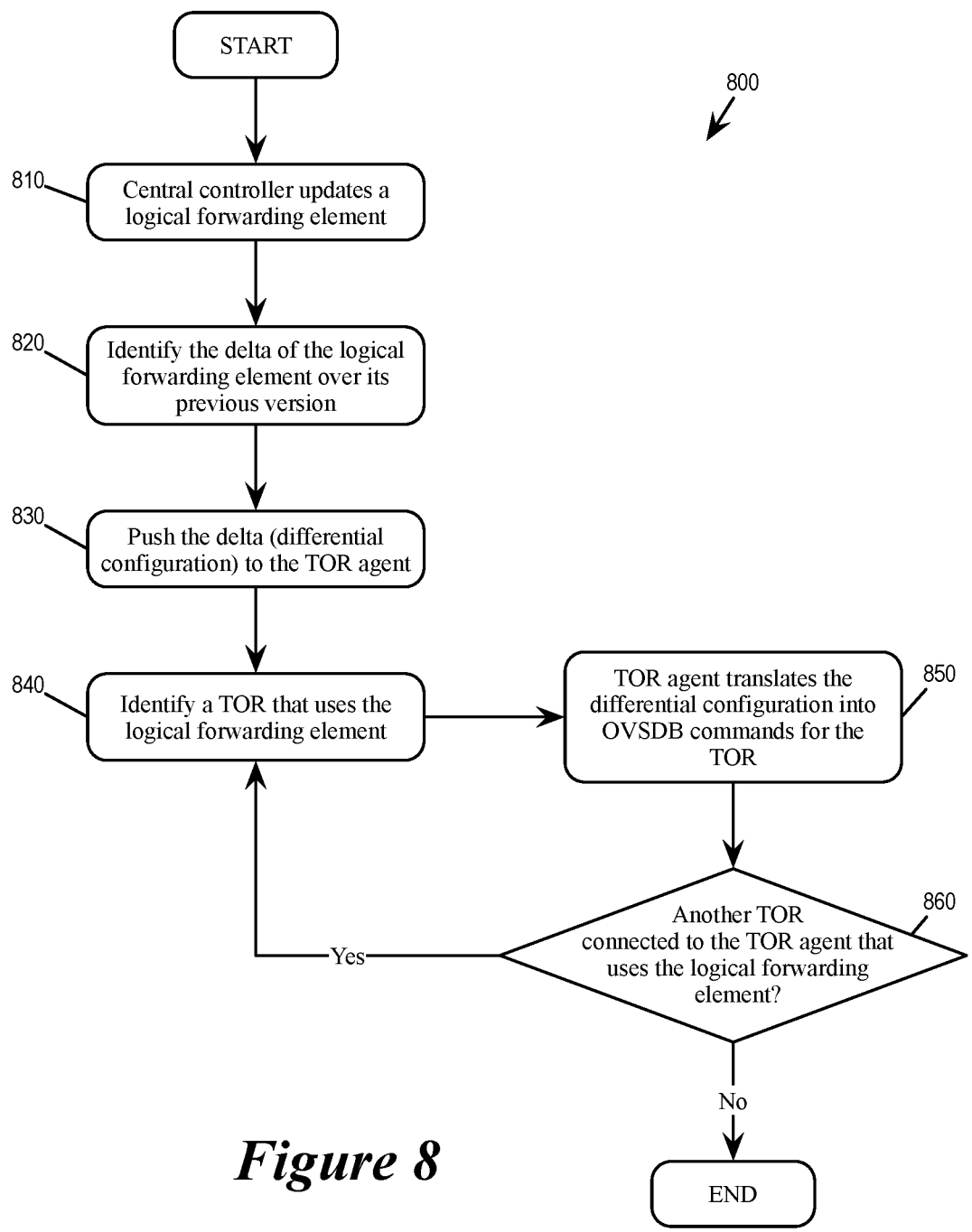
FIG. 8 conceptually illustrates a process for steady-state update or synchronization of logical forwarding element.

FIG. 8 conceptually illustrates a process 800 for steady-state update or synchronization of logical forwarding element. This process includes actions performed by a CCP as well action performed by a TOR agent. In some embodiments in which a CCP runs a TOR agent process, the process 800 is entirely performed by the CCP. FIG. 6 describes an example of the operations of the process 800.

The process 800 starts when the CCP update (810) a logical forwarding element. Such update takes place when e.g., the network has learned new routes from the edge, or when the user has added new routes. The process then identifies (820) a delta of the logical forwarding element over its pervious version, i.e., the changes that were made due to the update. The process then pushes (830) the delta or differential configuration to the TOR agent.

Next, the process identifies (840) a TOR that uses the logical forwarding element. This operation is performed at the TOR agent in some embodiments by using information such as logical-switch to TOR binding. The process then translates (850) the differential configuration into commands or transactions (e.g., OVSDB) that can be understood by the TOR device. These commands update the state or configuration of the logical forwarding element at the TOR to match what is held at the CCP for the logical forwarding element.

The process then determines (at 860) whether there is another TOR that is connected to the TOR agent that also uses the logical forwarding element. If so, the process returns to 840 to send the update (i.e., differential configuration) to that other TOR device. Otherwise, the process 800 ends.

II. Example TOR Device

Figure 9:
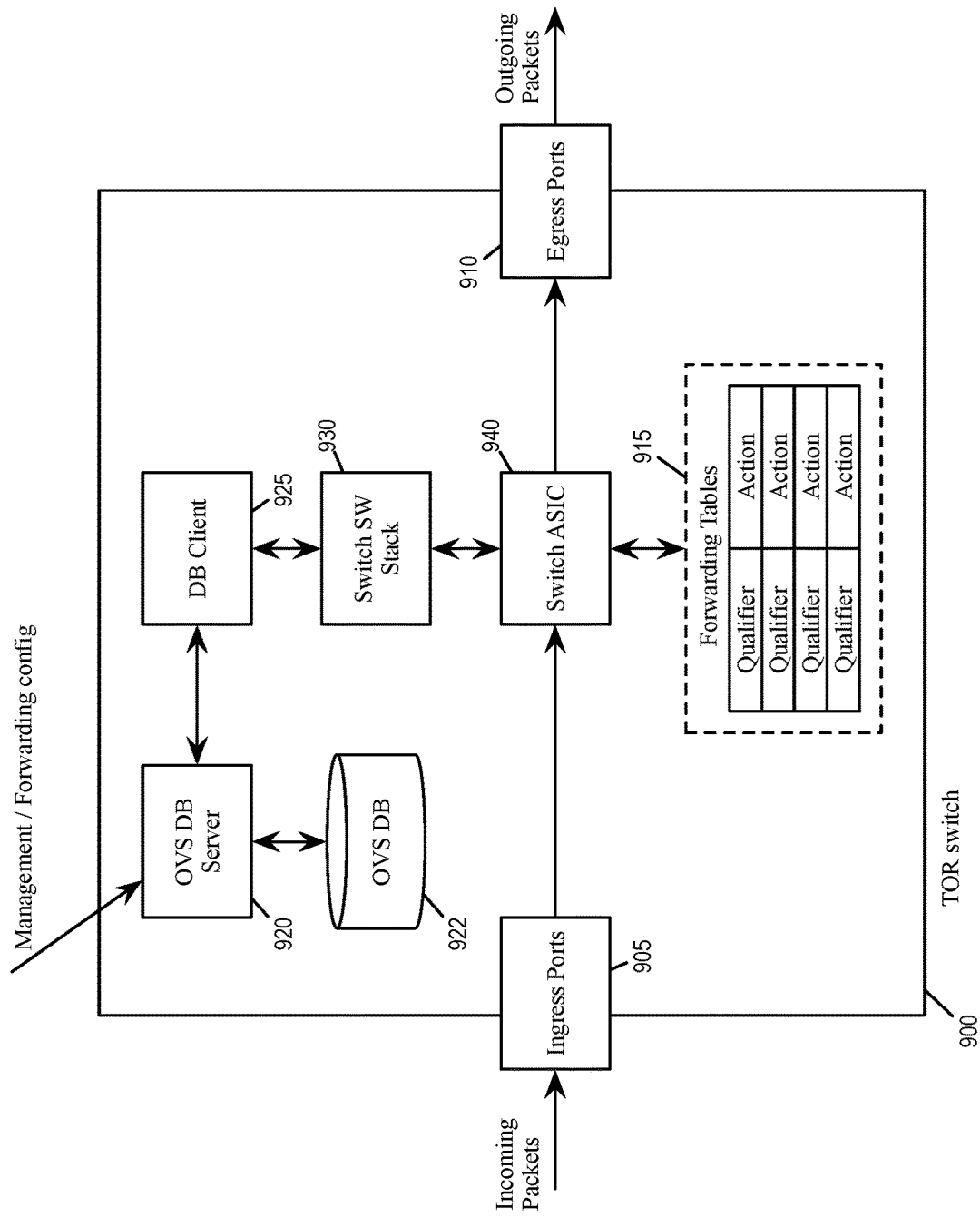
FIG. 9 conceptually illustrates an architectural diagram of an example TOR switch for some embodiments of the invention.

FIG. 9 conceptually illustrates an architectural diagram of an example hardware switch 900 (e.g., a third-party switch, or TOR) for some embodiments of the invention. As illustrated in this figure, the switch 900 includes ingress ports 905, egress ports 910, and forwarding tables 915. The TOR switch 900 also includes the database server 920, the database client 925, the SW Stack 930, and the switch ASIC 940.

The ingress ports 905 conceptually represent a set of ports through which the switch 900 receives network data. The ingress ports 905 may include different amounts of ingress ports in different embodiments. As shown, the ingress ports 905 can receive network data that is external to the switch 900, which is indicated as incoming packets in this example. When a packet is received through an ingress port, the switch 900 may send the packet to the switch ASIC 225 so that the packet can be quickly processed.

The egress ports 910 conceptually represent a set of ports through which the switching 900 sends network data. The egress ports 910 may include different amounts of egress ports in different embodiments. In some embodiments, some or all of the egress ports 910 may overlap with some or all of the ingress ports 905. For instance, in some such embodiments, the set of ports of the egress ports 910 is the same set of ports as the set of ports of ingress ports 905. As illustrated in FIG. 9, the egress ports 910 receive network data after the switch 900 processes the network data based on the forwarding tables 915. When the egress ports 910 receive network data (e.g., packets), the switch 900 sends the network data out of the egress ports 910, which is indicated as outgoing packets in this example, based on an entry in the forwarding tables 915.

In some embodiments, the forwarding tables 915 store active flow tables and/or flow entries that are used to determine operations for making switching decisions. In this example, each flow entry is includes a qualifier and an action. The qualifier defines a set of fields to match against a set of packet header fields. As shown in FIG. 9, the flow entries are stored in memory. The memory can be random access memory (RAM) or some other type of memory such as Content Addressable Memory (CAM) or Ternary Content Addressable Memory (TCAM). For example, a vendor may design their Layer 2 switches with CAM for performing Layer 2 switching and/or with TCAM for performing Quality of Service (QoS) functions. The switch architecture may support the ability to perform multiple lookups into multiple distinct CAM and/or TCAM regions in parallel. The CAM and TCAM are examples of switching ASICs that some vendors' switches leverage for line-speed fast switching.

As described above, an instance of the database server 920 controls access to the database 922. The database client 925 accesses the database 922 to read and write management data and forwarding state. In addition, a database client on the network controller accesses the database 922 to read and write management data and forwarding state. The database server 920 may send a notification to one database client (e.g., on the switch end) if the other database client (e.g., on the network controlled end) updates a table or a subset of a table of the database 922.

One other distinction to note is that the hardware switch's model is more generalized than that of the software switch's model. In the software switch, the network controller has specific knowledge of how forwarding works, and takes advantage of it. On the other hand, the operations of the hardware switch can vary from one third-party vendor to another. Therefore, in the hardware model, database is more abstract in that it contains the basic information to manage the hardware and exchange forwarding state.

III. Computing Device & Virtualization Software

Figure 10:
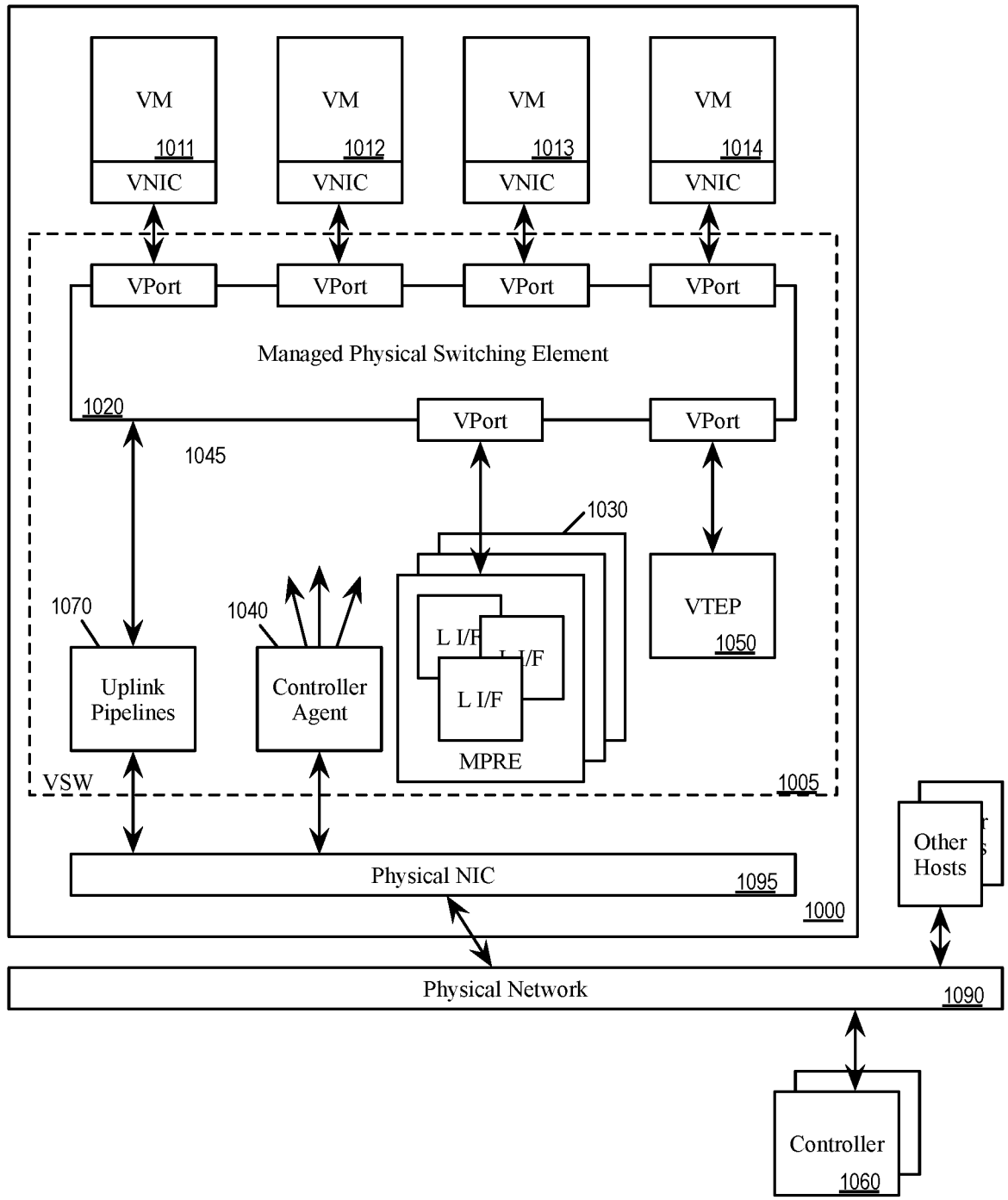
FIG. 10 illustrates a computing device that serves as a host machine for some embodiments of the invention.

FIG. 10 illustrates a computing device 1000 that serves as a host machine (or host physical endpoint) for some embodiments of the invention. The computing device 1000 is running virtualization software that implements a physical switching element and a set of physical routing elements. (i.e., MPSE and MPREs).

As illustrated, the computing device 1000 has access to a physical network 1090 through a physical NIC (PNIC) 1095. The host machine 1000 also runs the virtualization software 1005 and hosts VMs 1011-1014. The virtualization software 1005 serves as the interface between the hosted VMs and the physical NIC 1095 (as well as other physical resources, such as processors and memory). Each of the VMs includes a virtual NIC (VNIC) for accessing the network through the virtualization software 1005. Each VNIC in a VM is responsible for exchanging packets between the VM and the virtualization software 1005. In some embodiments, the VNICs are software abstractions of physical NICs implemented by virtual NIC emulators.

The virtualization software 1005 manages the operations of the VMs 1011-1014, and includes several components for managing the access of the VMs to the physical network (by implementing the logical networks to which the VMs connect, in some embodiments). As illustrated, the virtualization software includes several components, including a MPSE 1020, a set of MPREs 1030, a controller agent 1040, a VTEP 1050, and a set of uplink pipelines 1070.

The VTEP (VXLAN tunnel endpoint) 1050 allows the host machine 1000 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 1000 sends a data packet (e.g., an ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 1070.

The controller agent 1040 receives control plane messages from a controller or a cluster of controllers. In some embodiments, these control plane message includes configuration data for configuring the various components of the virtualization software (such as the MPSE 1020 and the MPREs 1030) and/or the virtual machines. In the example illustrated in FIG. 10, the controller agent 1040 receives control plane messages from the controller cluster 1060 from the physical network 1090 and in turn provides the received configuration data to the MPREs 1030 through a control channel without going through the MPSE 1020. However, in some embodiments, the controller agent 1040 receives control plane messages from a direct data conduit (not illustrated) independent of the physical network 1090. In some other embodiments, the controller agent receives control plane messages from the MPSE 1020 and forwards configuration data to the router 1030 through the MPSE 1020.

The MPSE 1020 delivers network data to and from the physical NIC 1095, which interfaces the physical network 1090. The MPSE also includes a number of virtual ports (vPorts) that communicatively interconnects the physical NIC with the VMs 1011-1014, the MPREs 1030 and the controller agent 1040. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 1090 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 1030 perform L3 routing on data packets received from a virtual port on the MPSE 1020. In some embodiments, this routing operation entails resolving L3 IP address to a next-hop L2 MAC address and a next-hop VNI (i.e., the VNI of the next-hop's L2 segment). Each routed data packet is then sent back to the MPSE 1020 to be forwarded to its destination according to the resolved L2 MAC address. This destination can be another VM connected to a virtual port on the MPSE 1020, or a reachable L2 network element on the physical network 1090 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or local MPSE running in each host machine.

In some embodiments, the MPRE 1030 includes one or more logical interfaces (LIFs) that each serves as an interface to a particular segment (L2 segment or VXLAN) of the network. In some embodiments, each LIF is addressable by its own IP address and serve as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order indicate in which host machine does the MPRE operate.

The uplink module 1070 relays data between the MPSE 1020 and the physical NIC 1095. The uplink module 1070 includes an egress chain and an ingress chain that each performs a number of operations. Some of these operations are pre-processing and/or post-processing operations for the MPRE 1030. The operations of LIFs, uplink module, MPSE, and MPRE are described in U.S. patent application Ser. No. 14/137,862 filed on Dec. 20, 2013, titled "Logical Router", published as U.S. Patent Application Publication 2015/0106804.

As illustrated by FIG. 10, the virtualization software 1005 has multiple MPREs for multiple different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE 1020, and hence a same L2 MAC address (vMAC or pMAC). In some other embodiments, each different MPRE belonging to a different tenant has its own port to the MPSE.

The MPSE 1020 and the MPRE 1030 make it possible for data packets to be forwarded amongst VMs 1011-1014 without being sent through the external physical network 1090 (so long as the VMs connect to the same logical network, as different tenants' VMs will be isolated from each other). Specifically, the MPSE performs the functions of the local logical switches by using the VNIs of the various L2 segments (i.e., their corresponding L2 logical switches) of the various logical networks. Likewise, the MPREs perform the function of the logical routers by using the VNIs of those various L2 segments. Since each L2 segment/L2 switch has its own a unique VNI, the host machine 1000 (and its virtualization software 1005) is able to direct packets of different logical networks to their correct destinations and effectively segregates traffic of different logical networks from each other.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
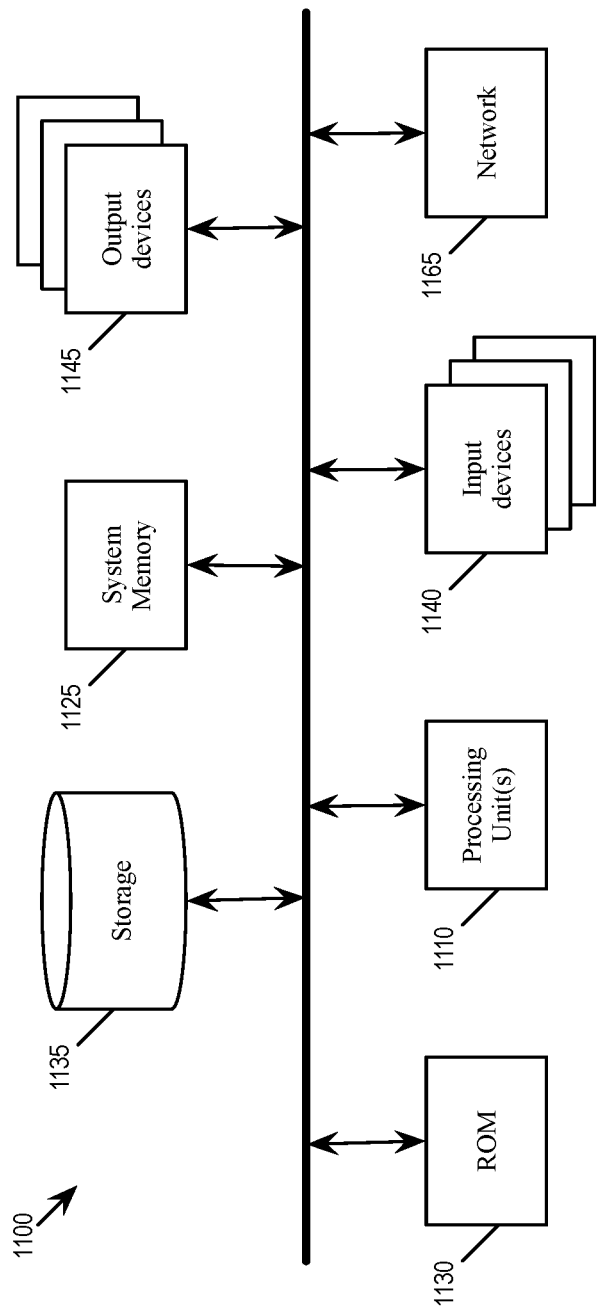
FIG. 11 conceptually illustrates an electronic system with which some embodiments of the invention are implemented.

FIG. 11 conceptually illustrates an electronic system 1100 with which some embodiments of the invention are implemented. The electronic system 1100 can be used to execute any of the control, virtualization, or operating system applications described above. The electronic system 1100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1125, and the permanent storage device 1135.

From these various memory units, the processing unit(s) 1110 retrieves instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1125 is a read-and-write memory device. However, unlike storage device 1135, the system memory is a volatile read-and-write memory, such a random access memory. The system memory stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieves instructions to execute and data to process in order to execute the processes of some embodiments.

The bus 1105 also connects to the input and output devices 1140 and 1145. The input devices enable the user to communicate information and select commands to the electronic system. The input devices 1140 include alphanumeric keyboards and pointing devices (also called "cursor control devices"). The output devices 1145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 7 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for a device controller configuring a managed hardware forwarding element (MHFE) in a network comprising a plurality of software forwarding elements (SFEs) and a set of central controllers, the method comprising:
receiving, from the central controllers, a first set of configuration data comprising an updated state for a logical forwarding element (LFE) jointly implemented by the MHFE and the SFEs;
receiving, from the MHFE, a second set of configuration data comprising a current state of the LFE;
computing a set of differential configuration data based on (i) the first set of configuration data received from the central controllers and (ii) the second set of configuration data received from the MHFE; and
using the set of differential configuration data to modify the configuration of the MHFE to implement the LFE with the updated state.

2. The method of claim 1, wherein the logical forwarding element is a logical switch for performing L2 packet switching in the network.

3. The method of claim 1, wherein the MHFE is a top-of-rack (TOR) switch that bridges an external network to the LFE.

4. The method of claim 1 further comprising:
prior to computing the differential configuration data, storing the received first set of configuration data in a storage of the device controller; and
after computing the differential configuration data, removing the received first set of configuration data from the storage of the device controller.

5. The method of claim 1, wherein the MHFE does not support a first protocol for exchanging configuration data that is supported by the central controllers and the SFEs, the method further comprising converting the set of differential configuration data from the first protocol to a second protocol supported by the MHFE, prior to using the differential configuration data to modify the configuration of the MHFE.

6. The method of claim 5, wherein converting the differential configuration data to the second protocol comprises converting the differential configuration data into a set of transactions to add and remove forwarding table entries from a table of the MHFE.

7. The method of claim 5, wherein the updated state of the LFE is a first updated state, wherein the set of differential configuration data is a first set of differential configuration data, the method further comprising:
receiving, from the central controllers, a second set of differential configuration data associated with a second updated state for the LFE;
converting the second set of differential configuration data from the first protocol to the second protocol; and
using the converted second set of differential configuration data to modify the configuration of the MIHFE to implement the LFE with the second updated state.

8. The method of claim 7, wherein the second set of differential configuration data is generated by a particular central controller based on the first updated state and the second updated state, wherein the particular controller controls the LFE.

9. The method of claim 5, wherein the MHFE is a first MHFE, wherein the set of differential configuration data is a first set of differential configuration data, the method further comprising:
receiving, from a second MHFE that does not support the first protocol and also jointly implements the LFE, a third set of configuration data comprising an obsolete state of the LFE;
computing a second set of differential configuration data based on the first and third sets of configuration data;
converting the second set of differential configuration data from the first protocol to a third protocol supported by the second MHFE;
using the converted second set of differential configuration data to modify the configuration of the second MHFE to implement the LFE with the updated state.

10. The method of claim 1, wherein the LFE is a first LFE, wherein the set of differential configuration data is a first set of differential configuration data, the method further comprising:
receiving, from the central controllers, a third set of configuration data comprising an updated state for a second LFE jointly implemented by the MHFE and at least one of the SFEs;
receiving, from the MHFE, a fourth set of configuration data comprising a current state of the second LFE;
computing a second set of differential configuration data based on the third and fourth sets of configuration data; and
using the second set of differential configuration data to modify the configuration of the MHFE to implement the second LFE with the updated state.

11. A non-transitory machine readable medium storing a program for a device controller which when executed by at least one processing unit configures a managed hardware forwarding element (MHFE) in a network comprising a plurality of software forwarding elements (SFEs) and a set of central controllers, the program comprising sets of instructions for:
receiving, from the central controllers, a first set of configuration data comprising an updated state for a logical forwarding element (LFE) jointly implemented by the MHFE and the SFEs;
receiving, from the MHFE, a second set of configuration data comprising a current state of the LFE;
computing a set of differential configuration data based on (i) the first set of configuration data received from the central controllers and (ii) the second set of configuration data received from the MHFE; and
using the set of differential configuration data to modify the configuration of the MHFE to implement the LFE with the updated state.

12. The non-transitory machine readable medium of claim 11, wherein the logical forwarding element is a logical switch for performing L2 packet switching in the network.

13. The non-transitory machine readable medium of claim 11, wherein the MHFE is a top-of-rack (TOR) switch that bridges an external network to the LFE.

14. The non-transitory machine readable medium of claim 11, wherein the program further comprises sets of instructions for:
prior to computing the differential configuration data, storing the received first set of configuration data in a storage of the device controller; and
after computing the differential configuration data, removing the received first set of configuration data from the storage of the device controller.

15. The non-transitory machine readable medium of claim 11, wherein the MHFE does not support a first protocol for exchanging configuration data that is supported by the central controllers and the SFEs, wherein the program further comprises sets of instructions for converting the set of differential configuration data from the first protocol to a second protocol supported by the MHFE, prior to using the differential configuration data to modify the configuration of the MHFE.

16. The non-transitory machine readable medium of claim 15, wherein the set of instructions for converting the differential configuration data to the second protocol comprises a set of instructions for converting the differential configuration data into a set of transactions to add and remove forwarding table entries from a table of the MHFE.

17. The non-transitory machine readable medium of claim 15, wherein the updated state of the LFE is a first updated state, wherein the set of differential configuration data is a first set of differential configuration data, wherein the program further comprises sets of instructions for:
  receiving, from the central controllers, a second set of differential configuration data associated with a second updated state for the LFE;
  converting the second set of differential configuration data from the first protocol to the second protocol; and
  using the converted second set of differential configuration data to modify the configuration of the MHFE to implement the LFE with the second updated state.

18. The non-transitory machine readable medium of claim 17, wherein the second set of differential configuration data is generated by a particular central controller based on the first updated state and the second updated state, wherein the particular controller controls the LFE.

19. The non-transitory machine readable medium of claim 15, wherein the MHFE is a first MHFE, wherein the set of differential configuration data is a first set of differential configuration data, wherein the program further comprises sets of instructions for:
  receiving, from a second MHFE that does not support the first protocol and also jointly implements the LFE, a third set of configuration data comprising an obsolete state of the LFE;
  computing a second set of differential configuration data based on the first and third sets of configuration data;
  converting the second set of differential configuration data from the first protocol to a third protocol supported by the second MHFE;
  using the converted second set of differential configuration data to modify the configuration of the second MHFE to implement the LFE with the updated state.

20. The non-transitory machine readable medium of claim 11, wherein the LFE is a first LFE, wherein the set of differential configuration data is a first set of differential configuration data, wherein the program further comprises sets of instructions for:
  receiving, from the central controllers, a third set of configuration data comprising an updated state for a second LFE jointly implemented by the MHFE and at least one of the SFEs;
  receiving, from the MHFE, a fourth set of configuration data comprising a current state of the second LFE;
  computing a second set of differential configuration data based on the third and fourth sets of configuration data; and
  using the second set of differential configuration data to modify the configuration of the MHFE to implement the second LFE with the updated state.

* * * * *